(12) United States Patent
Kitamura et al.

(10) Patent No.: US 11,335,036 B2
(45) Date of Patent: May 17, 2022

(54) IMAGE SYNTHESIZING SYSTEM AND IMAGE SYNTHESIZING METHOD

(71) Applicant: HITACHI, LTD., Tokyo (JP)

(72) Inventors: Shogo Kitamura, Tokyo (JP); Kyohei Unno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 41 days.

(21) Appl. No.: 16/958,277

(22) PCT Filed: Nov. 28, 2018

(86) PCT No.: PCT/JP2018/043703
§ 371 (c)(1),
(2) Date: Jun. 26, 2020

(87) PCT Pub. No.: WO2019/138716
PCT Pub. Date: Jul. 18, 2019

(65) Prior Publication Data
US 2020/0349743 A1    Nov. 5, 2020

(30) Foreign Application Priority Data

Jan. 10, 2018    (JP) .............................. JP2018-001764

(51) Int. Cl.
*G09G 5/00*       (2006.01)
*G06T 11/00*     (2006.01)
(Continued)

(52) U.S. Cl.
CPC ............... *G06T 11/00* (2013.01); *G06T 7/70* (2017.01); *H04N 5/2253* (2013.01);
(Continued)

(58) Field of Classification Search
CPC .... G09G 5/14; G09G 2340/125; G09G 5/395; G09G 2349/10; G09G 2340/12
(Continued)

(56) References Cited

U.S. PATENT DOCUMENTS

2009/0322891 A1    12/2009    Kondo et al.
2011/0267460 A1*   11/2011    Wang ..................... G08G 1/054
                                                                  348/135
(Continued)

FOREIGN PATENT DOCUMENTS

EP    2397386 A1    12/2011
EP    3 176 052 A1    6/2017
(Continued)

OTHER PUBLICATIONS

Mukojima, H., etc. Moving Camera Background-Subtraction for Obstacle Detection on Railway Tracks, ICIP 2016, IEEE, [online], [Retrieved on Sep. 29, 2021], Retrieved from the Internet: <URL: https://ieeexplore.ieee.org/document/7533104> (Year: 2016).*
(Continued)

*Primary Examiner* — Gordon G Liu
(74) *Attorney, Agent, or Firm* — Mattingly & Malur, PC

(57) ABSTRACT

An object of the present invention is to improve the image quality of images obtained during travelling even in inferior environmental conditions. A camera 101-1 is mounted in a train 1-1, and a camera 101-2 is mounted in a train 1-2. Each of the camera 101-1 and the camera 101-2 images the same physical object at different times while moving along the same track 5. A processing apparatus 2 generates a synthetic image 7 by synthesizing images related to the same physical object imaged by the cameras 101-1 and 101-2 while moving along the same track 5, and displays the same on a display screen 2A.

15 Claims, 20 Drawing Sheets

(51) Int. Cl.
  *G06T 7/70* (2017.01)
  *H04N 5/225* (2006.01)
  *H04N 5/247* (2006.01)
  *H04N 7/18* (2006.01)

(52) U.S. Cl.
  CPC ............ *H04N 5/247* (2013.01); *H04N 7/181* (2013.01); *G06T 2207/10016* (2013.01); *G06T 2207/30252* (2013.01)

(58) Field of Classification Search
  USPC ........................................................ 345/634
  See application file for complete search history.

(56) References Cited

U.S. PATENT DOCUMENTS

| | | | |
|---|---|---|---|
| 2015/0235094 A1* | 8/2015 | Kraeling | B61L 23/047 348/148 |
| 2016/0332574 A1* | 11/2016 | Park | G06T 3/0062 |

FOREIGN PATENT DOCUMENTS

| | | |
|---|---|---|
| JP | 2011-152865 A | 8/2011 |
| JP | 2011-201423 A | 10/2011 |
| JP | 2012-001191 A | 1/2012 |
| JP | 2014-176065 A | 9/2014 |
| JP | 2015-060558 A | 3/2015 |
| JP | 2016-196233 A | 11/2016 |

OTHER PUBLICATIONS

Extended European Search Report received in corresponding European Application No. 18899995.7 dated Jul. 21, 2021.
International Search Report PCT/JP2018/043703 dated Feb. 19, 2019.
Japanese Office Action dated Jun. 16, 2020.

* cited by examiner

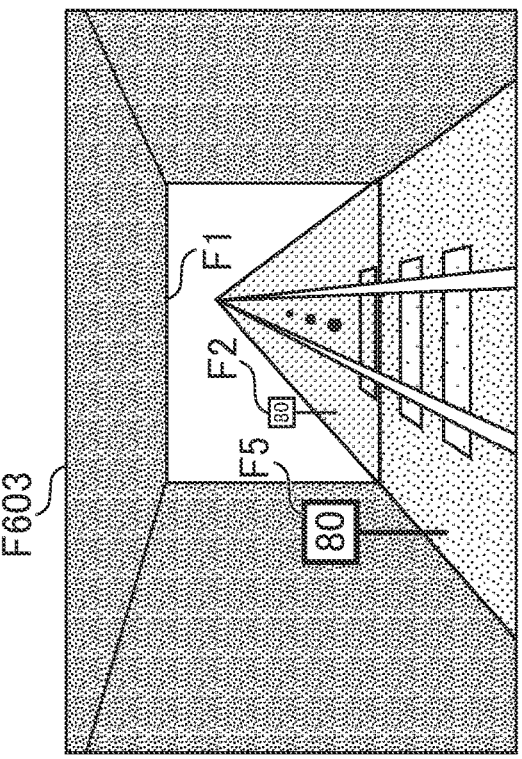
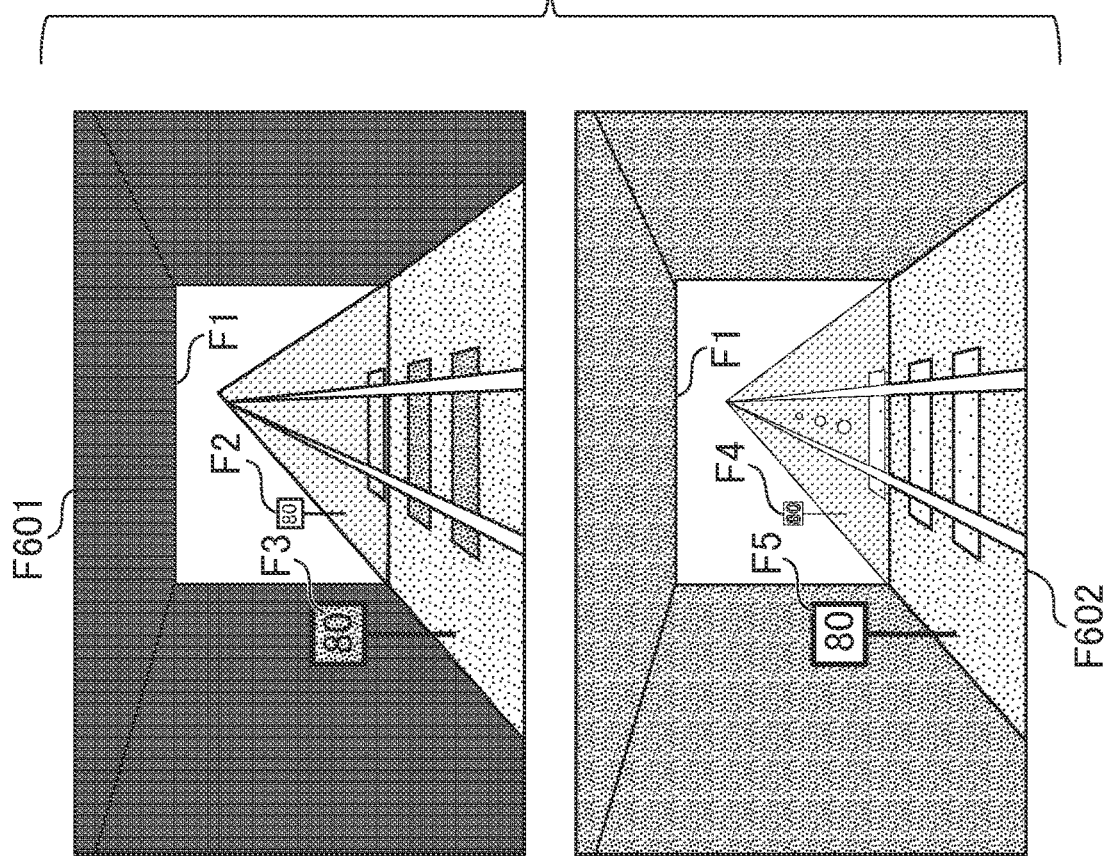
FIG. 11

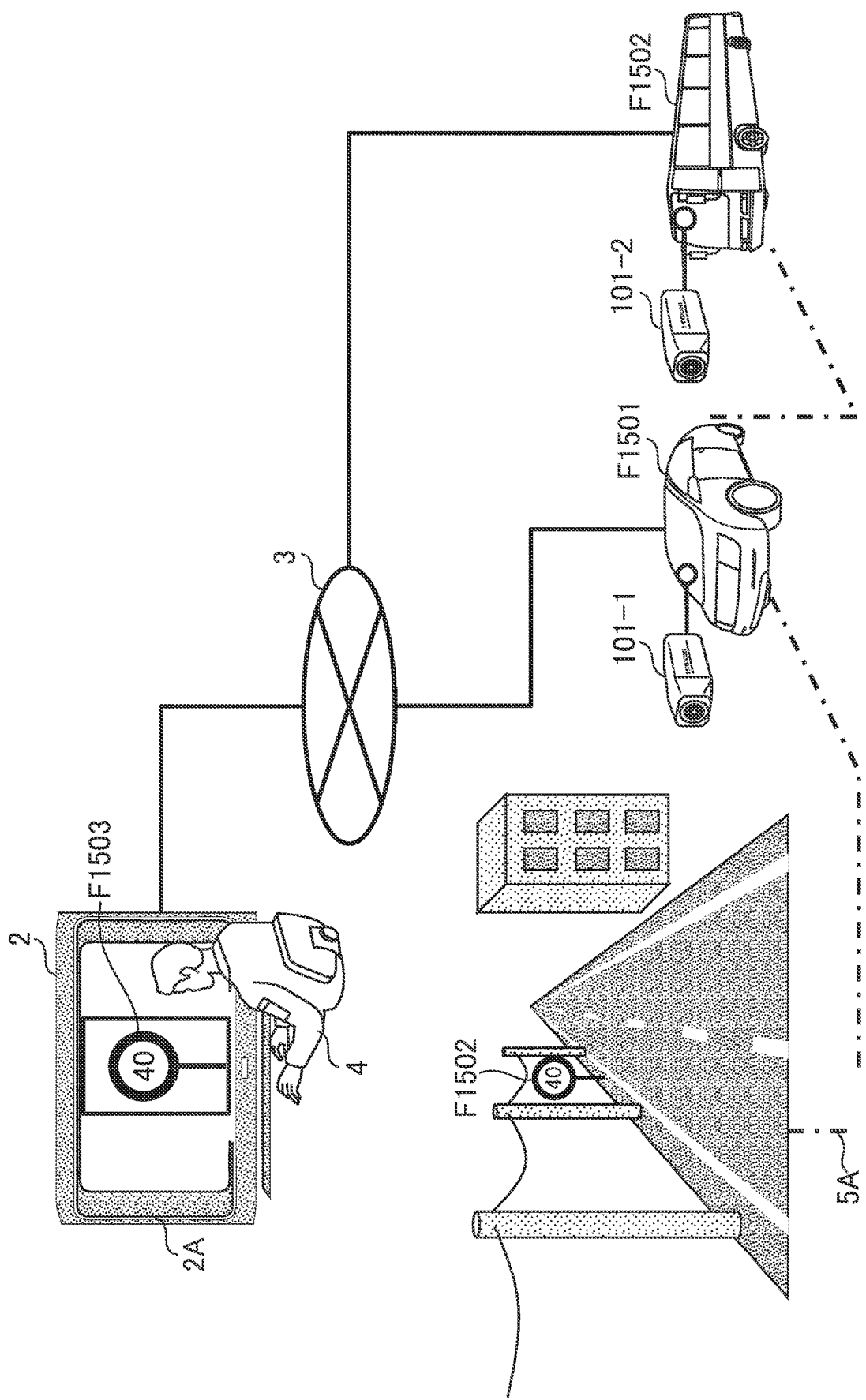

IMAGE SYNTHESIZING SYSTEM AND IMAGE SYNTHESIZING METHOD

TECHNICAL FIELD

The present invention relates to an image synthesizing system and an image synthesizing method using plural cameras.

BACKGROUND ART

As a main use application of an image synthesizing system, there is, for example, a railroad maintenance support system that monitors a wayside device from a remote location through a video. In railroad remote maintenance, a camera is mounted in a train to recognize a state of a wayside device around the train, and an analysis is conducted using photographed videos collected through a network or a portable storage in some cases.

Patent Literature 1 discloses an image processing system for a train that includes an imaging apparatus that images the outside of the train, a GPS (Global Positioning System) receiver, a train position detection unit that obtains the position of the train from the positioning result, a wayside installation device data storage unit that holds data of the position and image of a wayside installation device installed along a track, and a wayside installation device detection unit that decides an image search position on the basis of the position of the train and the position of the device when detecting a device image in the image imaged by the imaging apparatus.

CITATION LIST

Patent Literature

[Patent Literature 1] Japanese Unexamined Patent Application Publication No. 2011-201423

SUMMARY OF INVENTION

Technical Problem

However, in the case where a wayside device is photographed during high-speed travel, the train passes through the wayside device in a short time. Therefore, photographing is hindered in inferior environments such as low illuminance, a drizzly rain, and snow, and it has been difficult to collect videos with image quality worthy of an analysis in some cases.

The present invention has been made in view of the above-described circumstances, and an object thereof is to provide an image synthesizing system and an image synthesizing method that can improve the image quality of images obtained during travelling even in inferior environmental conditions.

Solution to Problem

In order to achieve the above-described object, an image synthesizing system according to a first aspect includes N (N is an integral number equal to or larger than 2) cameras, and a synthesizing unit that synthesizes images related to the same physical object imaged by the N cameras while moving along the same route.

Advantageous Effects of Invention

According to the present invention, it is possible to improve the image quality of images obtained during travelling even in inferior environmental conditions.

BRIEF DESCRIPTION OF DRAWINGS

FIG. 11 is a schematic diagram for showing an image synthesizing method of an image synthesizing system according to a seventh embodiment.

FIG. 20 is a schematic diagram for showing an outline configuration of a road maintenance support system to which an image synthesizing system according to a thirteenth embodiment is applied.

DESCRIPTION OF EMBODIMENTS

Embodiments will be described with reference to the drawings. It should be noted that the embodiments described below do not limit the invention according to claims, and elements and all the combinations thereof described in the embodiments are not necessarily essential for solving means of the invention.

First Embodiment

Figure 1:
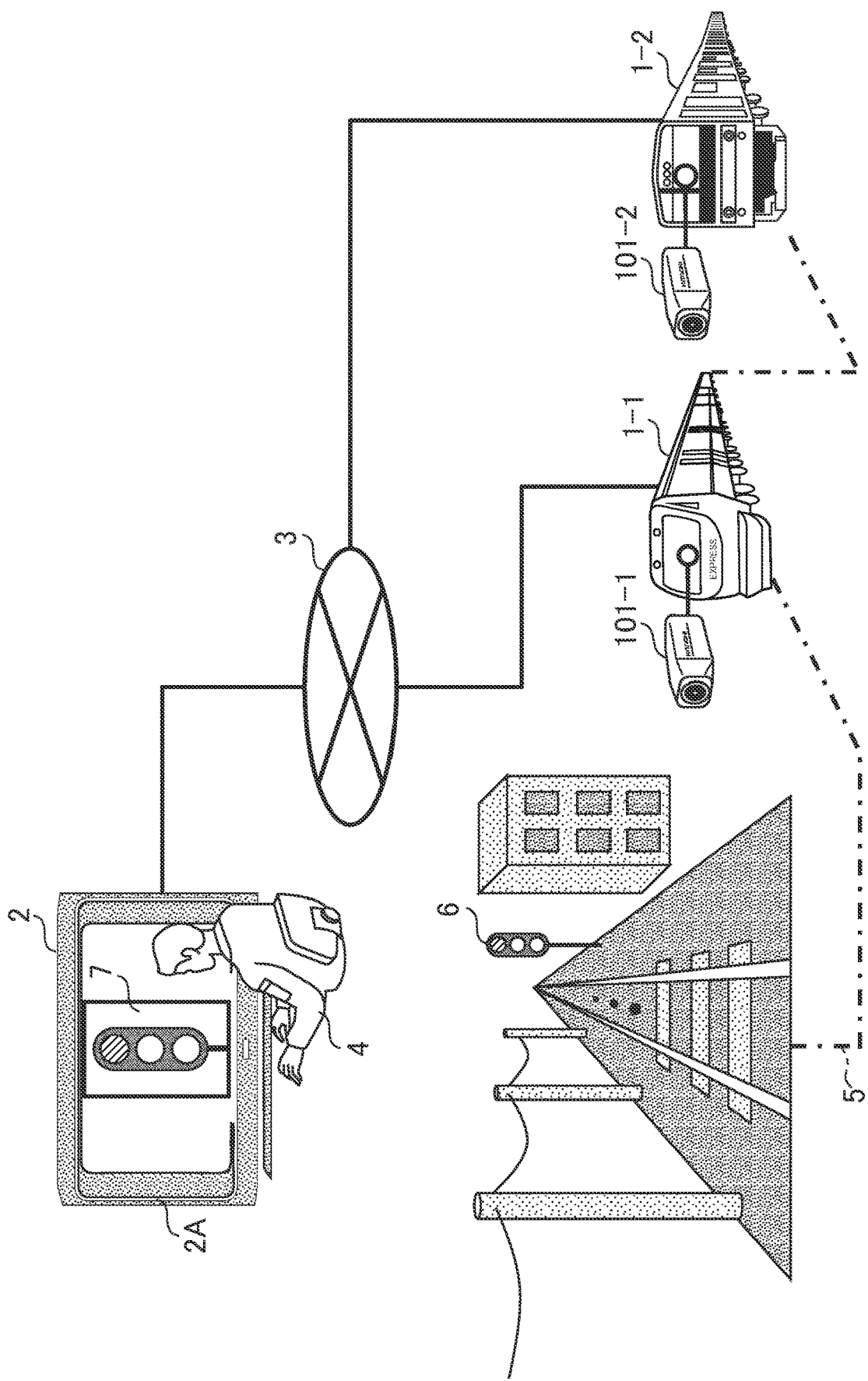
FIG. 1 is a schematic diagram for showing an outline configuration of a railroad maintenance support system to which an image synthesizing system according to a first embodiment is applied.

FIG. 1 is a schematic diagram for showing an outline configuration of a railroad maintenance support system to which an image synthesizing system according to a first embodiment is applied.

In FIG. 1, a wayside device 6 is provided around a track 5 on which trains 1-1 and 1-2 travel. FIG. 1 shows a case in which the track 5 is a railroad rail. The wayside device 6 is a signal, a point, a pole, an electric wire, a gate, a railroad crossing, a railroad crossing alarm, a transmission line, or the like. The railroad maintenance support system is provided with a processing apparatus 2 and cameras 101-1 and 101-2. The processing apparatus 2 is provided with a display screen 2A. The processing apparatus 2 and the cameras 101-1 and 101-2 are connected to each other through a network 3.

The network 3 may be a WAN (Wide Area Network) such as the Internet or a digital lease line or an LAN (Local Area Network) such as Ethernet (registered trademark) or WiFi, or a WAN and a LAN may be mixed. The network 3 may be a wired network or a wireless network, or a wired network and a wireless network may be mixed.

The camera 101-1 is mounted in the train 1-1, and the camera 101-2 is mounted in the train 1-2. At this time, each of the cameras 101-1 and 101-2 can image the same physical object at different times while moving along the same track 5. The processing apparatus 2 generates a synthetic image 7 by synthesizing images related to the same physical object imaged by the cameras 101-1 and 101-2 while moving along the same track 5, and can display the same on the display screen 2A.

The trains 1-1 and 1-2 can travel in series on the track 5 at different times. Each of the cameras 101-1 and 101-2 can image an object along the railroad line during the travelling of the trains 1-1 and 1-2. At this time, when each of the trains 1-1 and 1-2 approaches the wayside device 6, the wayside device 6 falls within the angle of view of each of the cameras 101-1 and 101-2, and is imaged by each of the cameras 101-1 and 101-2. The images imaged by each of the cameras 101-1 and 101-2 are transmitted to the processing apparatus 2 through the network 3.

When receiving the images imaged by each of the cameras 101-1 and 101-2, the processing apparatus 2 extracts a region of the wayside device 6 from each image. Then, the processing apparatus 2 generates the synthetic image 7 by synthesizing the region of the wayside device 6 extracted from each image, and displays the same on the display screen 2A. A maintenance person 4 conducts a visual inspection of the synthetic image 7, so that even in the case where the maintenance person 4 is at a remote location apart from the wayside device 6, a maintenance inspection of the wayside device 6 can be conducted without a patrol on foot to the actual installation place of the wayside device 6.

Here, even in the case where the cameras 101-1 and 101-2 image the wayside device 6 while moving along the same track 5 and unclear parts are present in the image imaged by each of the cameras 101-1 and 101-2 by synthesizing the images related to the wayside device 6, the synthetic image 7 related to the wayside device 6 can be generated so as to make the unclear parts inconspicuous. Therefore, even in the case where the cameras 101-1 and 101-2 pass through the wayside device 6 in a short time under inferior environmental conditions such as low illuminance, a drizzly rain, and snow, the synthetic image 7 with image quality worthy of an analysis can be obtained.

In addition, since the cameras 101-1 and 101-2 image the wayside device 6 while moving, the maintenance person 4 can monitor a state along the track 5 over a wide range in a short time, and efficient railroad maintenance can be realized.

It should be noted that although an example in which a region of the wayside device 6 is extracted from the image imaged by each of the cameras 101-1 and 101-2 has been described in the embodiment, it is not necessary to extract the region of the wayside device 6 in the case of inspection items overviewing the entire track 5 on which the trains 1-1 and 1-2 travel such as confirmation of the dense state of trees along the railroad line.

In addition, a processing unit that performs the extraction of the region and the synthesis of the images in the processing apparatus 2 may be independently provided and additionally installed on the network 3 as a cloud server. Further, a portable storage may be mounted in each of the trains 1-1 and 1-2, and the images imaged by each of the cameras 101-1 and 101-2 may be stored in the portable storage. At this time, the processing apparatus 2 can collect the images imaged by each of the cameras 101-1 and 101-2 without using the network 3 by reading the data stored in the portable storage, and can perform an off-line analysis.

Figure 2:
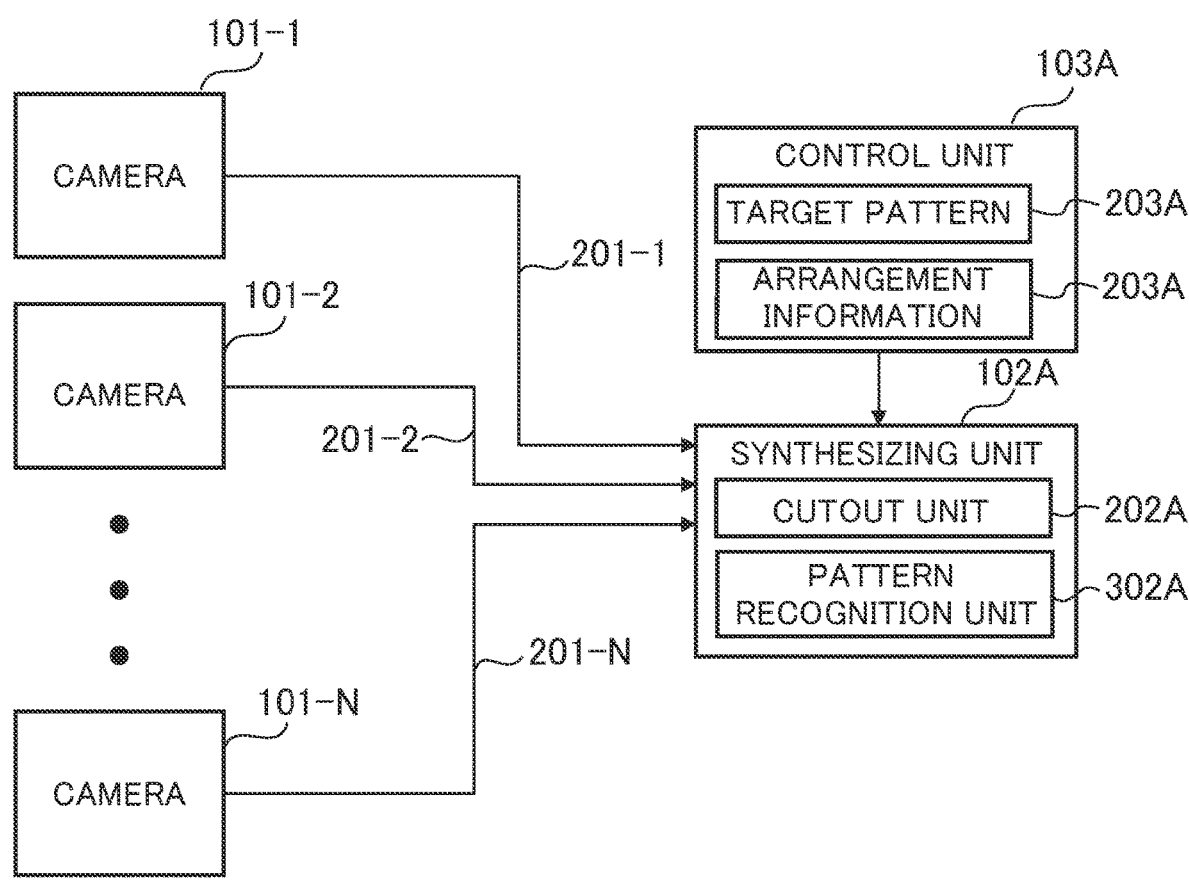
FIG. 2 is a block diagram for showing a configuration of the image synthesizing system according to the first embodiment.

FIG. 2 is a block diagram for showing a configuration of the image synthesizing system according to the first embodiment.

In FIG. 2, the image synthesizing system is provided with cameras 101-1 to 101-N (N is an integral number equal to or larger than 2), a synthesizing unit 102A, and a control unit 103A. The synthesizing unit 102A and the control unit 103A can be provided in the processing apparatus 2 of FIG. 1.

Each of the cameras 101-1 to 101-N can image the same physical object at different times while moving along the same track. The synthesizing unit 102A synthesizes images related to the same physical object imaged by each of the cameras 101-1 to 101-N while moving along the same track. The control unit 103A sets synthesizing conditions of the images related to the same physical object imaged by each of the cameras 101-1 to 101-N.

Images 201-1 to 201-N imaged by each of the cameras 101-1 to 101-N are input to the synthesizing unit 102A. The synthesizing unit 102A synthesizes images related to the same physical object imaged by each of the cameras 101-1 to 101-N. At this time, the control unit 103A provides information necessary for the synthesizing unit 102A to synthesize the images to the synthesizing unit 102A. For example, the control unit 103A can instruct to synthesize images with a physical object specified as an inspection item. At this time, the synthesizing unit 102A extracts images with a physical object specified by the control unit 103A from those imaged by each of the cameras 101-1 to 101-N by using a method such pattern verification, and can synthesize the images.

At this time, a cutout unit 302A and a pattern recognition unit 202A can be provided in the synthesizing unit 102A. The control unit 103A can hold a target pattern 203A to be synthesized by the synthesizing unit 102A and arrangement information 303A of the target pattern 203A. The arrangement information 303A can indicate the position of the target pattern 203A in each of the images 201-1 to 201-N imaged by each of the cameras 101-1 to 101-N.

Then, the cutout unit 202A cuts out a region specified in the arrangement information 303A from the images 201-1 to 201-N imaged by each of the cameras 101-1 to 101-N. The pattern recognition unit 202A compares an image of the region cut out by the cutout unit 202A with the target pattern 203A specified by the control unit 103A, and extracts an image matching the target pattern 203A as an image related to the same physical object from the images 201-1 to 201-N imaged by each of the cameras 101-1 to 101-N. Then, the synthesizing unit 102A synthesizes the images related to the same physical object extracted from the images 201-1 to 201-N imaged by each of the cameras 101-1 to 101-N.

In the example of FIG. 1, the target pattern 203A is an image of the wayside device 6 imaged at the time of a train operation. For example, the target pattern 203A can be obtained in such a manner that the wayside device 6 is imaged at the time of a trial operation of a train and the image of the wayside device 6 is used as the target pattern 203A. The target pattern 203A can be imaged in good weather without snowfalls and fog. Information indicating the arrangement position of the wayside device 6 in the image imaged at the time of the trial operation of the train can be used as the arrangement information 303A of the target pattern 203A. It should be noted that the target pattern 203A may be created using computer graphics.

Here, the trains 1-1 and 1-2 in which the cameras 101-1 and 101-2 are mounted, respectively, travel on the same track 5. Therefore, even in the case where the cameras 101-1 and 101-2 are differently mounted in the trains 1-1 and 1-2, it is possible to obtain images of the wayside device 6 having the same arrangement position and size in the images 201-1 to 201-N imaged by each of the cameras 101-1 and 101-2 when each of the trains 1-1 and 1-2 passes through the wayside device 6. As a result, the synthesizing unit 102A can accurately identify the images of the wayside device 6 from the images 201-1 to 201-N imaged by the cameras 101-1 and 101-2 on the basis of the target pattern 203A and the arrangement information 303A.

In the case where the images related to the same physical object imaged by each of the cameras 101-1 to 101-N are synthesized, a part that is not changed among the images imaged by each of the cameras 101-1 to 101-N can be left as it is, and a part that is changed among the images imaged by each of the cameras 101-1 to 101-N can be removed.

Figure 3:
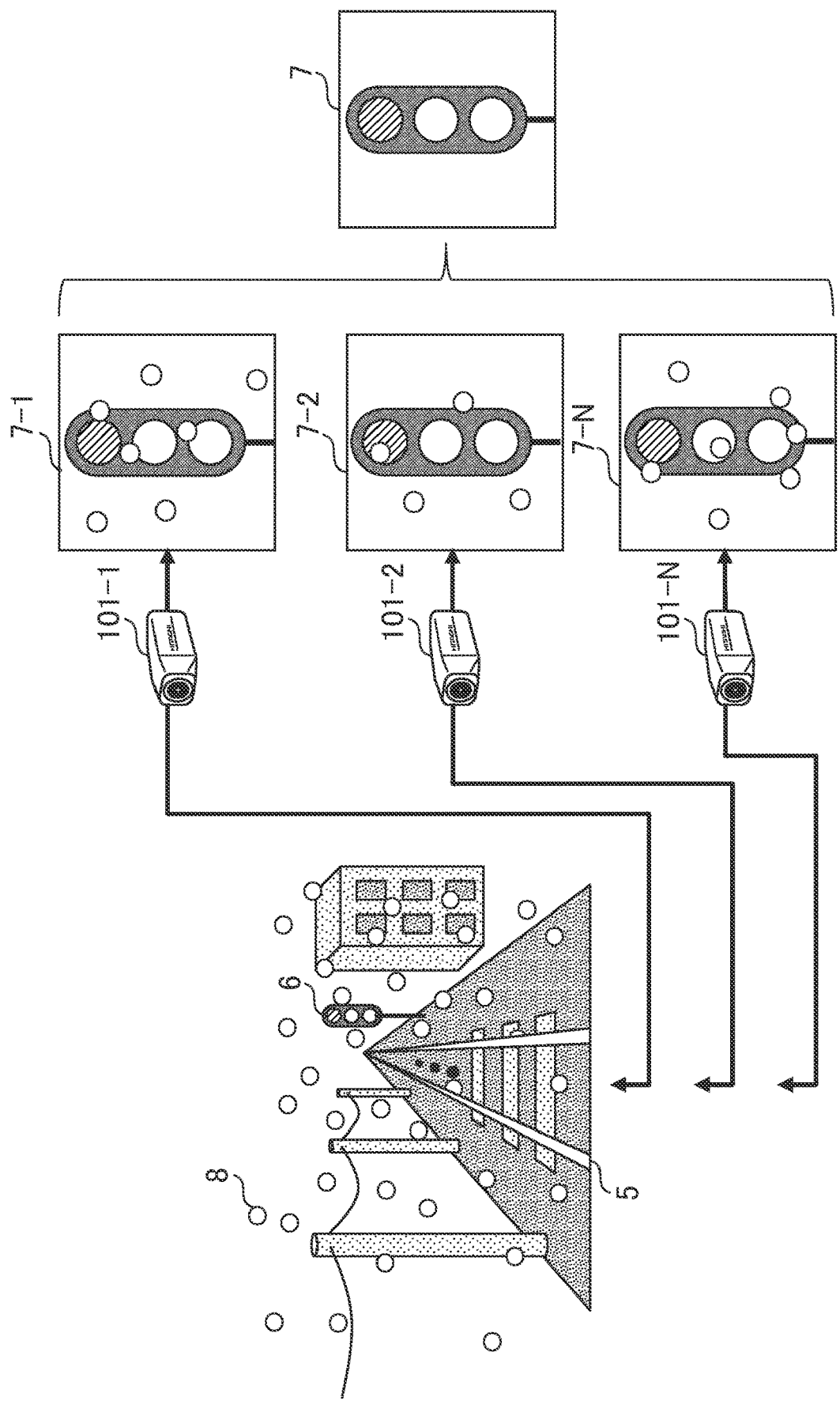
FIG. 3 is a schematic diagram for showing an image synthesizing method of the image synthesizing system according to the first embodiment.

FIG. 3 is a schematic diagram for showing an image synthesizing method of the image synthesizing system according to the first embodiment.

In FIG. 3, a state in which there were snowfalls 8 when a train travelled on the track 5 is assumed. At this time, the snowfalls 8 become a hindrance factor for visibility to the wayside device 6, and the visibility of images 7-1 to 7-N related to the wayside device 6 imaged by each of the cameras 101-1 to 101-N is lowered.

The images 7-1 to 7-N are imaged by the cameras 101-1 to 101-N moving on the same track 5, respectively. Therefore, the position and size of the image of the wayside device 6 are constant among the images 7-1 to 7-N. On the other hand, the positions of the hindrance factor due to the snowfalls with respect to the wayside device 6 are randomly distributed. Accordingly, the synthesizing unit 102A of FIG. 2 can generate the synthetic image 7 in such a manner that, for example, the images 7-1 to 7-N are synthesized by applying an image process such as a median filter to the images 7-1 to 7-N. Accordingly, effects by the hindrance factor can be removed while holding the image information of the wayside device 6, and the visibility of the synthetic image 7 related to the wayside device 6 can be improved.

Figure 4:
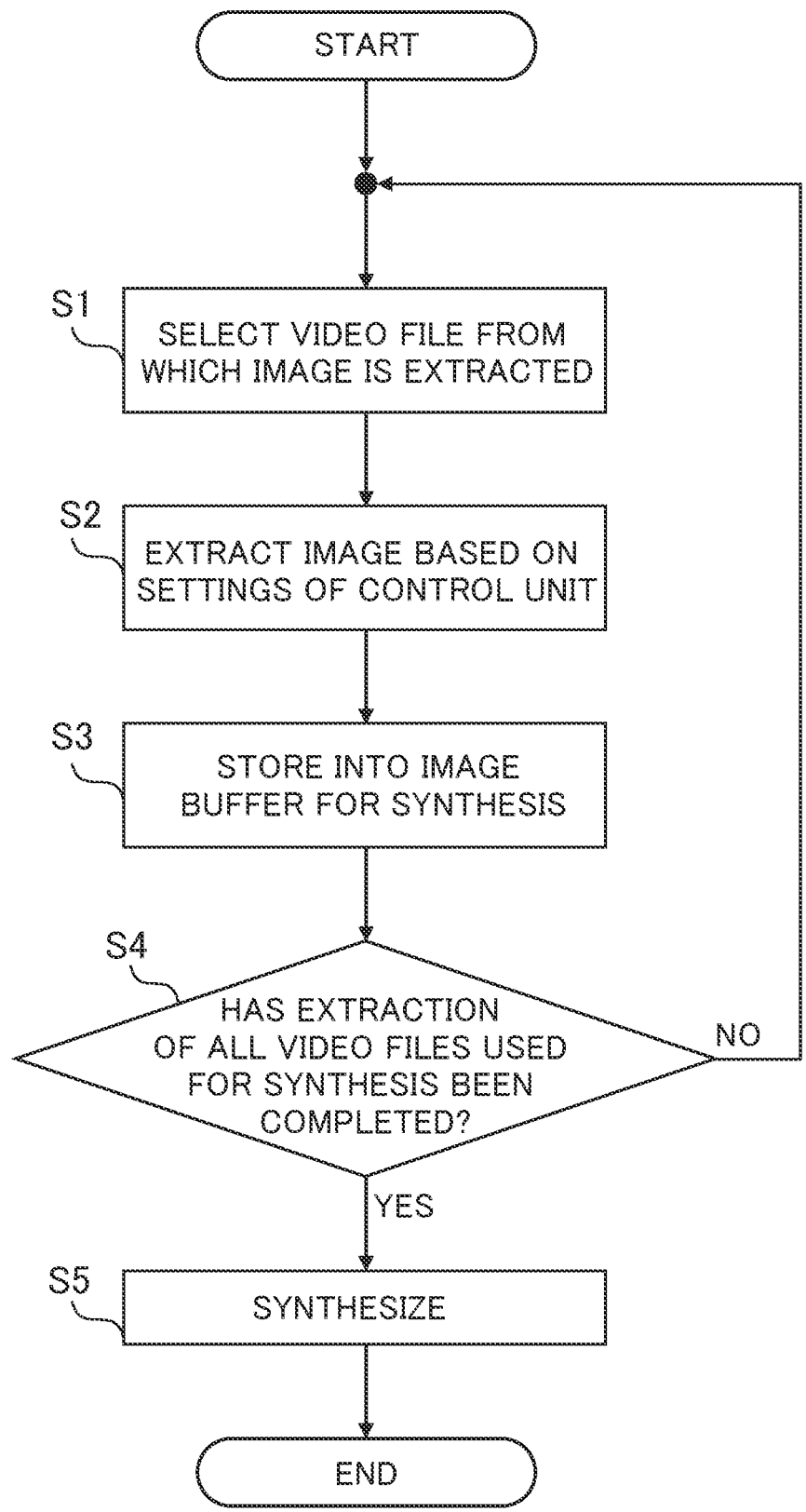
FIG. 4 is a flowchart for showing an example of an image synthesizing process of the image synthesizing system according to the first embodiment.

FIG. 4 is a flowchart for showing an example of an image synthesizing process of the image synthesizing system according to the first embodiment.

In FIG. 4, it is premised that images by the plural cameras 101-1 to 10 1-N have already been prepared as video files.

In Step S1, the synthesizing unit 102A selects a video file from which an image is extracted.

Next, in Step S2, the synthesizing unit 102A extracts an image on the basis of settings of the synthesizing conditions of the control unit 103A. Here, as the settings of the control unit 103A, positional information of the wayside device 6 and object detection information may be used.

Next, in Step S3, the synthesizing unit 102A stores the extracted image into an image buffer for synthesis.

Next, in Step S4, the synthesizing unit 102A determines whether or not images have been extracted from all the video files used for synthesis. In the case where images have not been extracted from all the video files used for synthesis, the flow returns to Step S1, and the processes of Steps S1 to S4 are repeated until images are extracted from all the video files used for synthesis.

Next, in Step S5, when images are extracted from all the video files used for synthesis, these images are synthesized.

Figure 5:
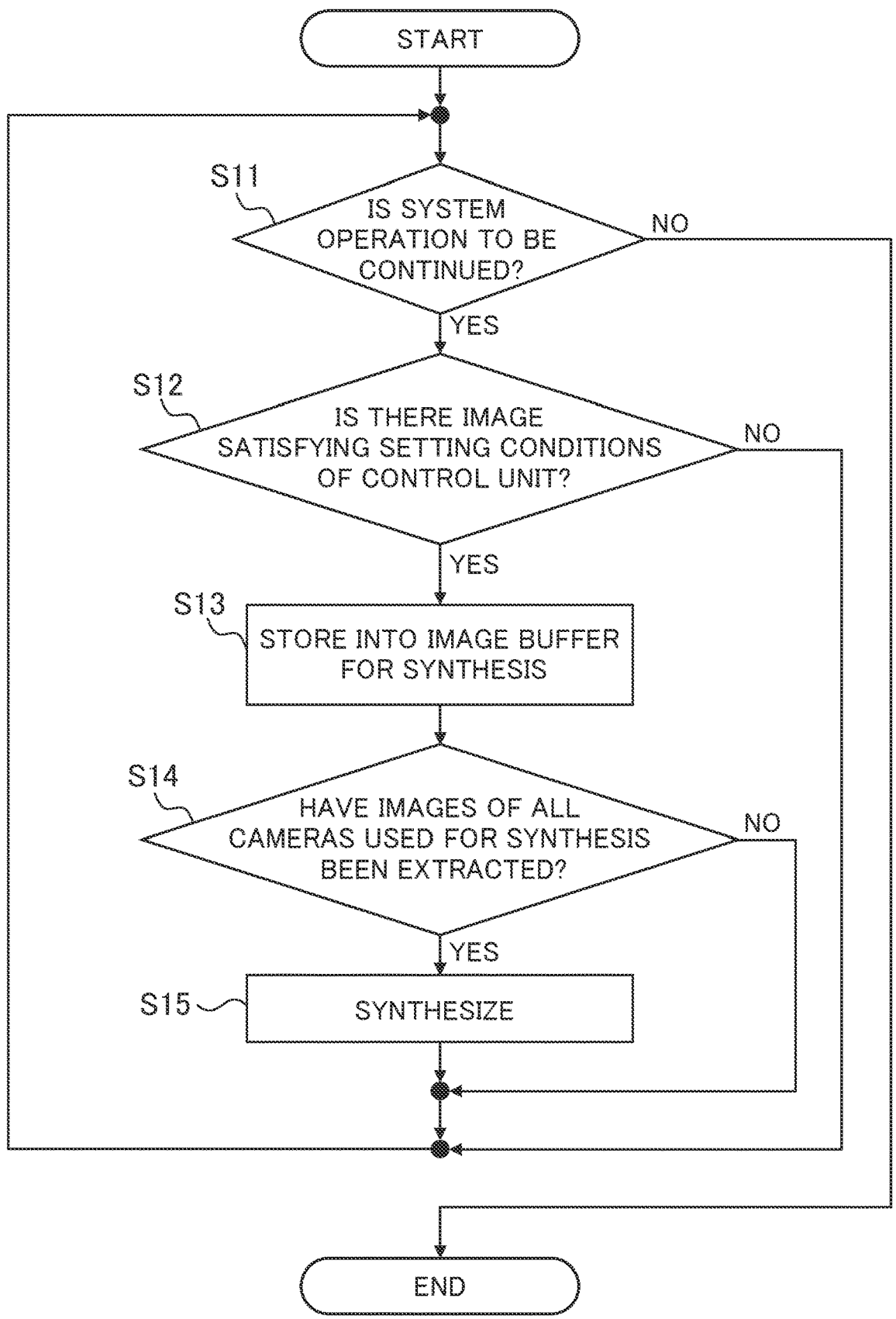
FIG. 5 is a flowchart for showing another example of the image synthesizing process of the image synthesizing system according to the first embodiment.

FIG. 5 is a flowchart for showing another example of the image synthesizing process of the image synthesizing system according to the first embodiment.

In FIG. 5, it is premised that the plural cameras 101-1 to 101-N are continuously taking photos while moving when the processing flow is operated.

In Step S11, the synthesizing unit 102A monitors the presence or absence of an operation termination command of the railroad maintenance support system, and determines whether or not to continue the system operation. In the case where the system operation is continued, the flow proceeds to Step S12, and the synthesizing unit 102A confirms whether or not an image satisfying the synthesizing conditions of the control unit 103A is present. In the case where an image satisfying the synthesizing conditions of the control unit 103A is present, the synthesizing unit 102A stores the image extracted in Step S13 into the image buffer for synthesis.

Next, in Step S14, the synthesizing unit 102A determines whether or not images of all the cameras 101-1 to 101-N used for synthesis have been extracted. In the case where images of all the cameras 101-1 to 101-N used for synthesis have not been extracted, the flow returns to Step S11, and the processes of Steps S11 to S14 are repeated until images of all the cameras 101-1 to 101-N used for synthesis are extracted.

Next, in Step S15, when images of all the cameras 101-1 to 101-N used for synthesis are extracted, these images are synthesized.

By employing the processing flow as described above, it is possible to realize the railroad maintenance support system that continuously performs the image synthesizing process while improving the visibility of images even under inferior environmental conditions such as low illuminance, a drizzly rain, and snow.

Second Embodiment

Figure 6:
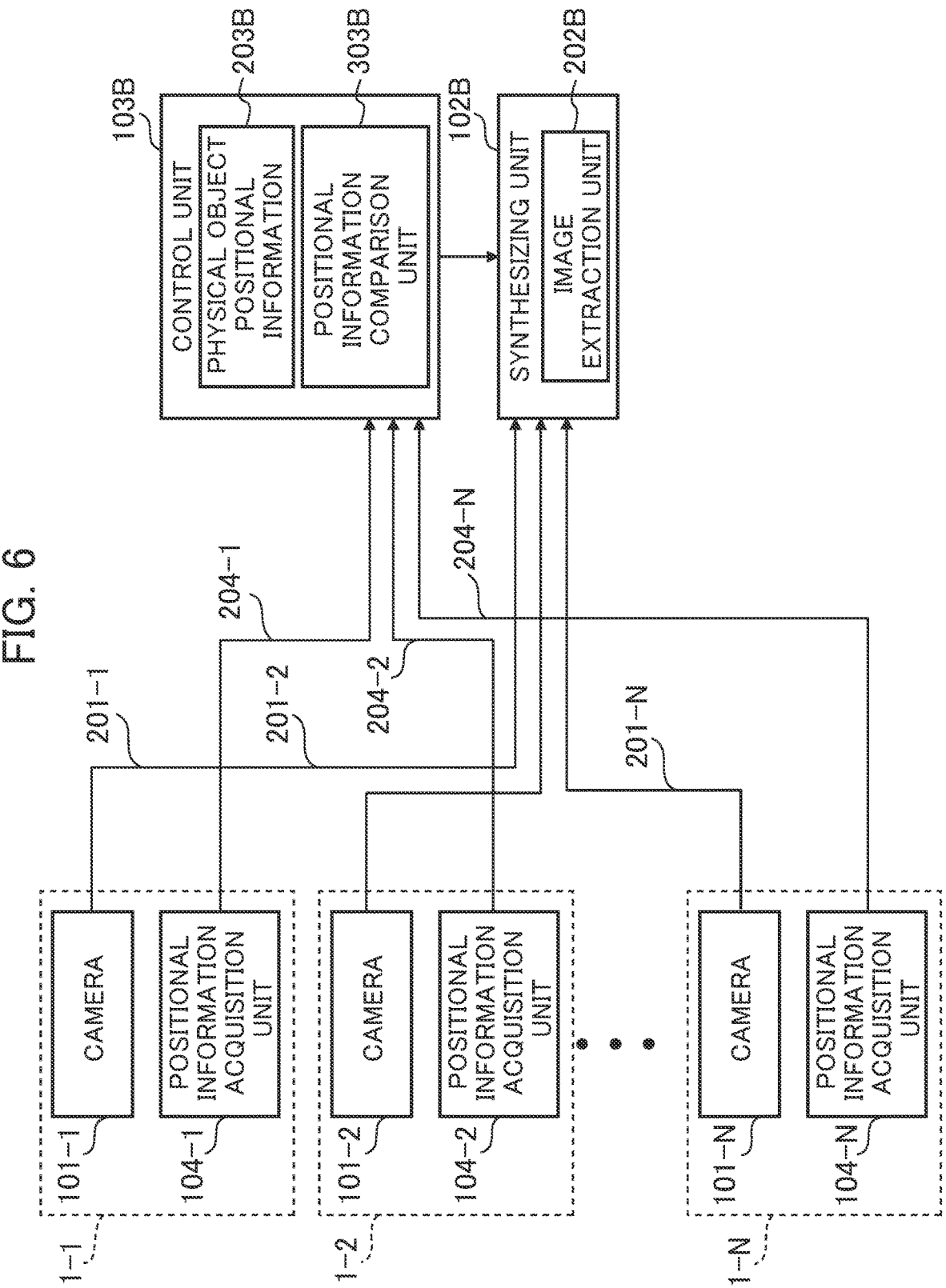
FIG. 6 is a block diagram for showing a configuration of an image synthesizing system according to a second embodiment.

FIG. 6 is a block diagram for showing a configuration of an image synthesizing system according to a second embodiment.

In FIG. 6, cameras 101-1 to 101-N and positional information acquisition units 104-1 to 104-N are mounted in trains 1-1 to 1-N, respectively. The positional information acquisition units 104-1 to 104-N may be GPS receivers or acceleration/gyro sensors.

In accordance with acquisition of images 201-1 to 201-N imaged by the cameras 101-1 to 101-N, the positional information acquisition units 104-1 to 104-N acquire pieces of camera positional information 204-1 to 204-N of the cameras 101-1 to 101-N at the same time, respectively. A synthesizing unit 102B synthesizes images related to the same physical object imaged by each of the cameras 101-1 to 101-N on the basis of the pieces of camera positional information 204-1 to 204-N of the cameras 101-1 to 101-N. A control unit 103B sets synthesizing conditions of the images related to the same physical object imaged by each of the cameras 101-1 to 101-N on the basis of the pieces of positional information of the cameras 101-1 to 101-N.

At this time, the control unit 103B can hold physical object positional information 203B indicating the position of a wayside device 6 arranged around a track 5. In addition, the control unit 103B can be provided with a positional information comparison unit 303B that compares the pieces of camera positional information 204-1 to 204-N with the physical object positional information 203B. The synthesizing unit 102B can be provided with an image extraction unit 202B that extracts an image related to the same physical object from those imaged by each of the cameras 101-1 to 101-N on the basis of the comparison result by the positional information comparison unit 303B.

The pieces of camera positional information 204-1 to 204-N acquired by the positional information acquisition units 104-1 to 104-N are input to the control unit 103B. The images 201-1 to 201-N imaged by the cameras 101-1 to 101-N are input to the synthesizing unit 102B. Then, the positional information comparison unit 303B compares the pieces of camera positional information 204-1 to 204-N of the cameras 101-1 to 101-N acquired by the positional information acquisition units 104-1 to 104-N with the physical object positional information 203B of the wayside device 6 arranged around the track 5. Then, when the pieces of camera positional information 204-1 to 204-N match the physical object positional information 203B, the control unit 103B sets the synthesizing conditions so as to extract and store images obtained when each of the cameras 101-1 to 101-N moves at the position of the wayside device 6. Then, the image extraction unit 202B extracts the images obtained when each of the cameras 101-1 to 101-N moves at the position of the wayside device 6 from the images 201-1 to 201-N imaged by the cameras 101-1 to 101-N. Then, the synthesizing unit 102B synthesizes the images related to the wayside device 6 collected when each of the cameras 101-1 to 101-N moves at the position of the wayside device 6.

Accordingly, plural images of the wayside device 6 used for maintenance can be extracted from an enormous amount of images 201-1 to 201-N obtained during long-time travel of each of the trains 1-1 to 1-N, and these images can be synthesized.

Third Embodiment

Figure 7:
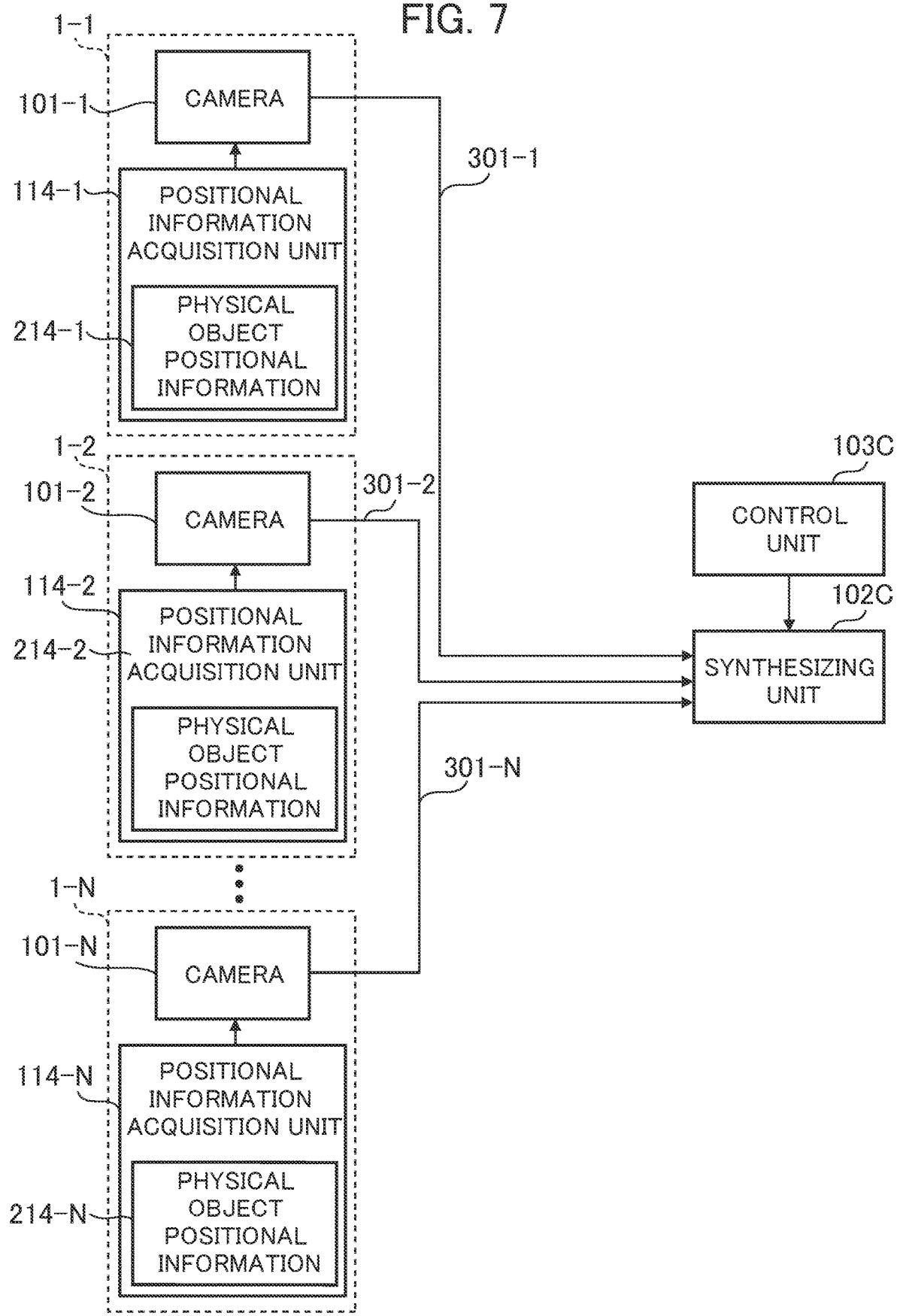
FIG. 7 is a block diagram for showing a configuration of an image synthesizing system according to a third embodiment.

FIG. 7 is a block diagram for showing a configuration of an image synthesizing system according to a third embodiment.

In FIG. 7, cameras 101-1 to 101-N and positional information acquisition units 114-1 to 114-N are mounted in trains 1-1 to 1-N, respectively.

In accordance with acquisition of images imaged by each of the cameras 101-1 to 101-N, the positional information acquisition units 114-1 to 114-N acquire pieces of camera positional information of the cameras 101-1 to 101-N at the same time. Here, the positional information acquisition units 114-1 to 114-N can preliminarily hold pieces of physical object positional information 214-1 to 214-N, respectively, each indicating the position of a wayside device 6 arranged around a track 5. A synthesizing unit 102C synthesizes images 301-1 to 301-N related to the same physical object imaged by the cameras 101-1 to 101-N. A control unit 103C sets synthesizing conditions of the images 301-1 to 301-N related to the same physical object imaged by each of the cameras 101-1 to 101-N.

Then, the positional information acquisition units 114-1 to 114-N compare the pieces of camera positional information of the cameras 101-1 to 101-N with the pieces of physical object positional information 214-1 to 214-N of the wayside device 6 arranged around the track 5, respectively. Then, in the case where these pieces of information match each other, the positional information acquisition units 114-1 to 114-N instruct to output the images 301-1 to 301-N imaged when each of the cameras 101-1 to 101-N moves at the position of the wayside device 6. Then, the images 301-1 to 301-N taken when each of the cameras 101-1 to 101-N moves at the position of the wayside device 6 are transmitted to the synthesizing unit 102C. The synthesizing unit 102C synthesizes the images 301-1 to 301-N related to the wayside device 6 on the basis of the synthesizing conditions of the control unit 103C.

Accordingly, the cameras 101-1 to 101-N can transmit only the images 301-1 to 301-N of the wayside device 6 used for maintenance to the synthesizing unit 102C among an enormous amount of images obtained during long-time travel of each of the trains 1-1 to 1-N, and a burden on a network 3 when the images are transmitted can be reduced.

Fourth Embodiment

Figure 8:
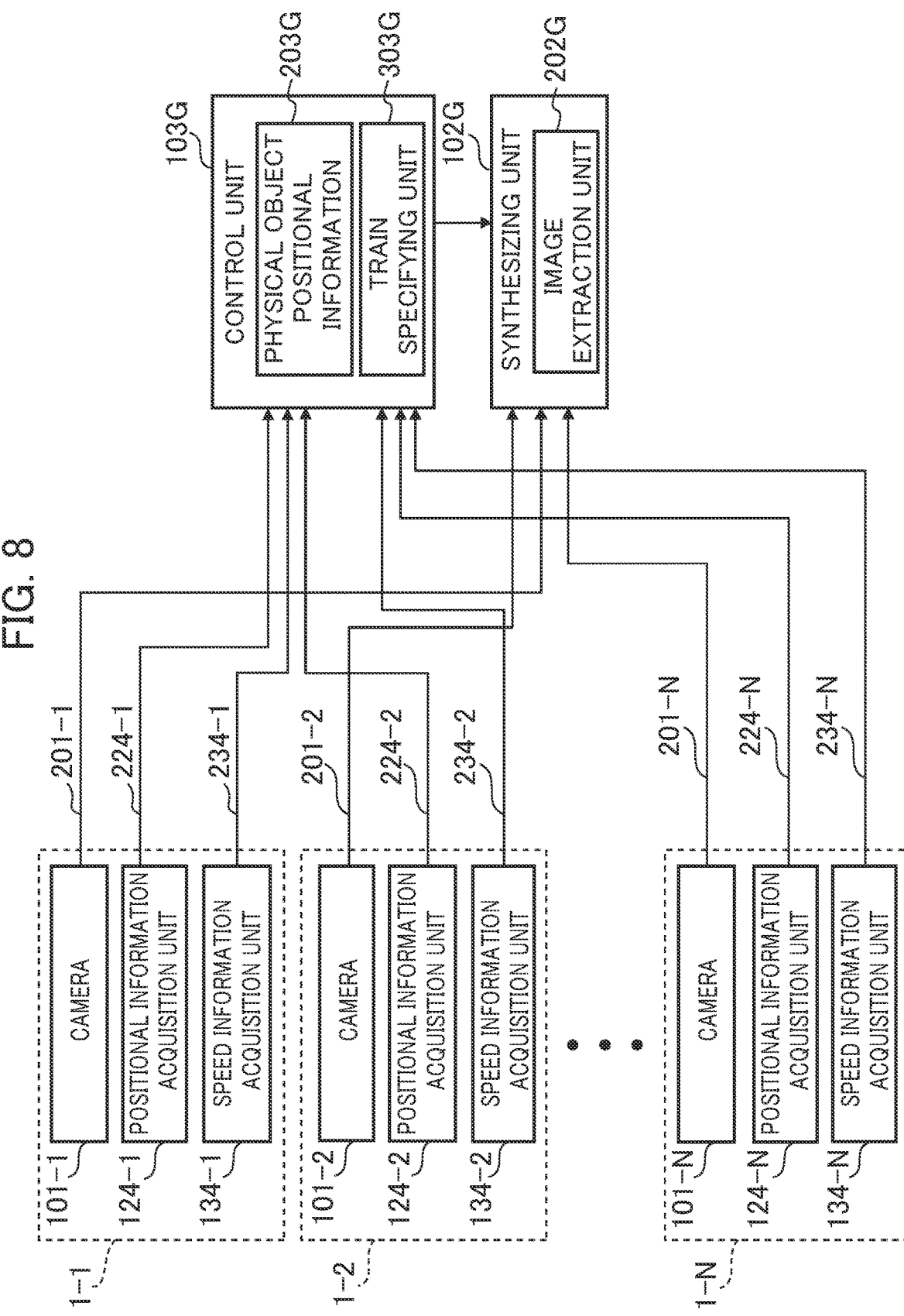
FIG. 8 is a block diagram for showing a configuration of an image synthesizing system according to a fourth embodiment.

FIG. 8 is a block diagram for showing a configuration of an image synthesizing system according to a fourth embodiment.

In FIG. 8, cameras 101-1 to 101-N, positional information acquisition units 124-1 to 124-N, and speed information acquisition units 134-1 to 134-N are mounted in trains 1-1 to 1-N, respectively. As the speed information acquisition units 134-1 to 134-N, acceleration sensors can be used.

The positional information acquisition units 124-1 to 124-N acquire pieces of train positional information 224-1 to 224-N of the trains 1-1 to 1-N, respectively. The speed information acquisition units 134-1 to 134-N acquire pieces of train speed information 234-1 to 234-N of the trains 1-1 to 1-N, respectively. A synthesizing unit 102G synthesizes images related to the same physical object imaged by each of the cameras 101-1 to 101-N. A control unit 103G sets synthesizing conditions of the images related to the same physical object imaged by each of the cameras 101-1 to 101-N.

At this time, the control unit 103G can hold physical object positional information 203G indicating the position of a wayside device 6 arranged around a track 5. In addition, the control unit 103G can be provided with a train specifying unit 303G specifying the trains 1-1 to 1-N that pass through the wayside device 6 within a predetermined time range. The synthesizing unit 102G can be provided with an image extraction unit 202G that extracts images related to the same physical object from those imaged by each of the cameras 101-1 to 101-N on the basis of the specification result of the trains 1-1 to 1-N by the train specifying unit 303G.

The pieces of train positional information 224-1 to 224-N acquired by the positional information acquisition units 124-1 to 124-N and the pieces of train speed information 234-1 to 234-N acquired by the speed information acquisition units 134-1 to 134-N are input to the control unit 103G. Images 201-1 to 201-N imaged by the cameras 101-1 to 101-N are input to the synthesizing unit 102G. Then, the train specifying unit 303G compares the pieces of train positional information 224-1 to 224-N with the physical object positional information 203G to calculate a distance between each of the trains 1-1 to 1-N and the wayside device 6. Then, on the basis of the pieces of train speed information 234-1 to 234-N of the trains 1-1 to 1-N, time until each of the trains 1-1 to 1-N reaches the wayside device 6 is calculated, and the trains 1-1 to 1-N that pass through the wayside device 6 within the predetermined time range are specified on the basis of the car length of each of the trains 1-1 to 1-N.

Then, the control unit 103G sets synthesizing conditions so as to extract and store the images imaged by the cameras 101-1 to 101-N mounted in the trains 1-1 to 1-N when each of the trains 1-1 to 1-N passes through the wayside device 6 within the predetermined time range. Then, the image extraction unit 202G extracts the images obtained when each of the cameras 101-1 to 101-N moves at the position of the wayside device 6 from the images 201-1 to 201-N imaged by the cameras 101-1 to 101-N. Then, the synthesizing unit 102G synthesizes the images related to the wayside device 6 collected when each of the cameras 101-1 to 101-N moves at the position of the wayside device 6.

Accordingly, even in the case where the pieces of train positional information 224-1 to 224-N are used to specify the positions of the cameras 101-1 to 101-N, plural images of the wayside device 6 used for maintenance can be extracted from an enormous amount of images 201-1 to 201-N obtained during long-time travel of each of the trains 1-1 to 1-N, and these images can be synthesized.

Fifth Embodiment

Figure 9:
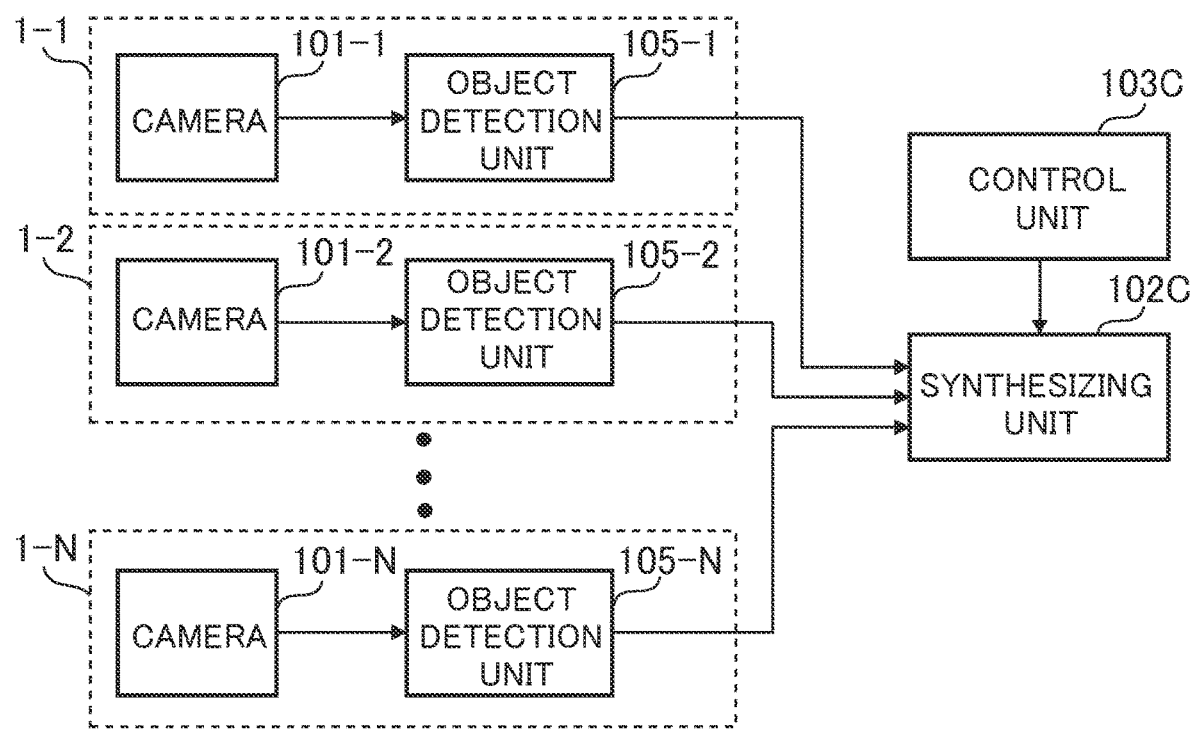
FIG. 9 is a block diagram for showing a configuration of an image synthesizing system according to a fifth embodiment.

FIG. 9 is a block diagram for showing a configuration of an image synthesizing system according to a fifth embodiment.

In FIG. 9, cameras 101-1 to 101-N and object detection units 105-1 to 105-N are mounted in trains 1-1 to 1-N, respectively.

Each of the object detection units 105-1 to 105-N extracts a target image of only the body of a wayside device 6 and a neighboring region thereof from images imaged by each of the cameras 101-1 to 101-N. An object detection algorithm such as template matching or machine learning can be applied to the extraction.

Each of the object detection units 105-1 to 105-N transmits the image of only the body of the wayside device 6 and the neighboring region to a synthesizing unit 102C. The synthesizing unit 102C synthesizes the images of only the body of the wayside device 6 and the neighboring region on the basis of synthesizing conditions of the control unit 103C.

Accordingly, since not only the amount of transmission data in a network 3 and the amount of storage data in a portable storage can be reduced, but also images with effects of vibration of each of the trains 1-1 to 1-N removed can be used for synthesis, the amount of calculations of a positioning process at the time of image synthesis can be reduced.

Sixth Embodiment

Figure 10:
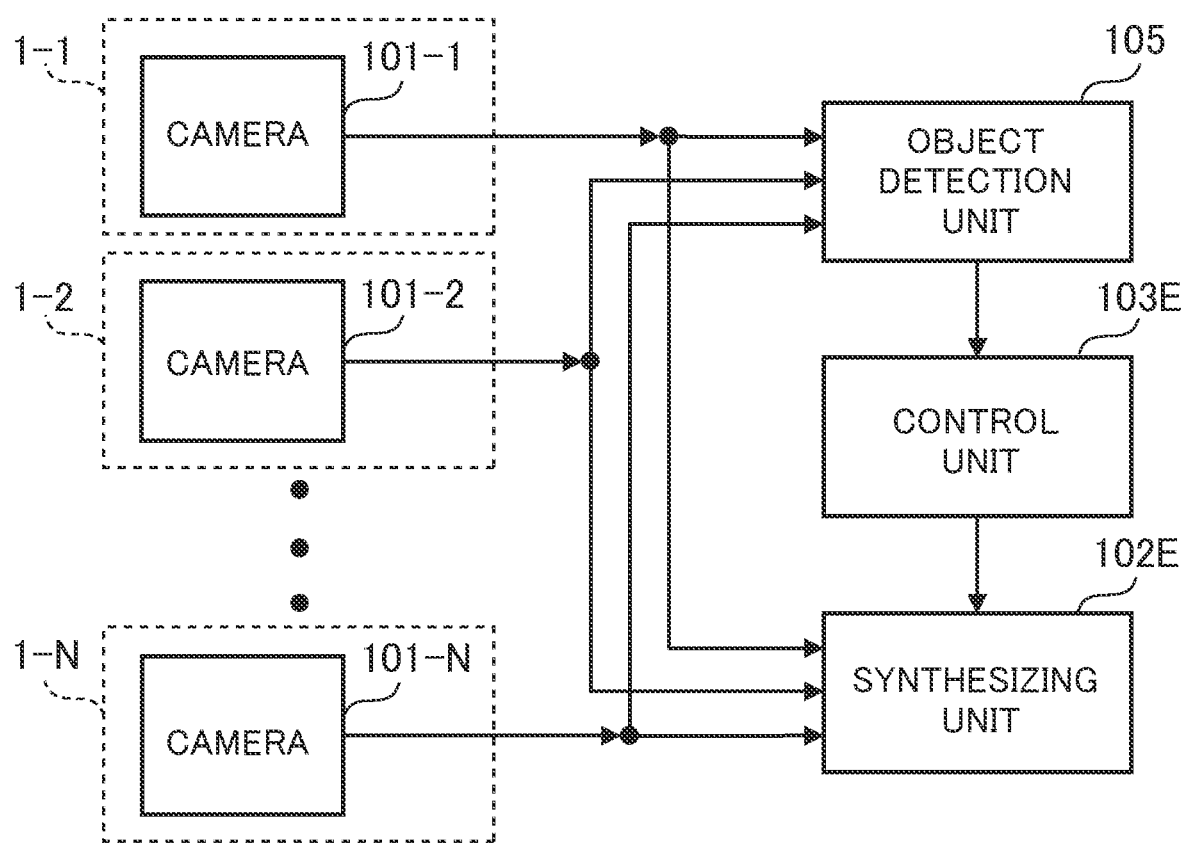
FIG. 10 is a block diagram for showing a configuration of an image synthesizing system according to a sixth embodiment.

FIG. 10 is a block diagram for showing a configuration of an image synthesizing system according to a sixth embodiment.

In FIG. 10, cameras 101-1 to 101-N are mounted in trains 1-1 to 1-N, respectively. Further, the image synthesizing system is provided with a synthesizing unit 102E, a control unit 103E, and an object detection unit 105.

Images imaged by each of the cameras 101-1 to 101-N are transmitted to the synthesizing unit 102E and the object detection unit 105. The object detection unit 105 applies an object detection algorithm to the images transmitted from each of the cameras 101-1 to 101-N, extracts the time when a target wayside device 6 is captured and information such as the position and size of a region of the wayside device 6 in each image, and outputs the same to the control unit 103E. The control unit 103E sets synthesizing conditions of the images imaged by each of the cameras 101-1 to 101-N on the basis of the information output from the object detection unit 105. The synthesizing unit 102E synthesizes the images related to the same physical object imaged by each of the cameras 101-1 to 101-N on the basis of the synthesizing conditions set by the control unit 103E.

Accordingly, even in the case where the object detection units 105-1 to 105-N of FIG. 9 are not mounted in the trains 1-1 to 1-N, respectively, images with effects of vibration of the trains removed can be used for synthesis, and the amount of calculations of a positioning process at the time of image synthesis can be reduced.

It should be noted that each of the configurations of FIG. 6 to FIG. 10 may be used alone in the railroad maintenance support system, or the configurations of FIG. 6 to FIG. 10 may be used by being appropriately combined with each other.

In addition, the photographic conditions of the plural cameras 101-1 to 101-N moving on the same track 5 are not necessarily the same, and may be set for each of the cameras 101-1 to 101-N.

Hereinafter, an example of setting an exposure condition, the angle of view, and a photographic direction that differ depending on the cameras 101-1 to 101-N will be described.

Seventh Embodiment

FIG. 11 is a schematic diagram for showing an image synthesizing method of an image synthesizing system according to a seventh embodiment.

In FIG. 11, a state in which the trains 1-1 and 1-2 of FIG. 1 travel in a tunnel in the daytime is assumed. At this time, it is assumed that an image F601 is generated by a camera 101-1 and an image F602 is generated by a camera 101-2.

In each of the images F601 and F602, the outside of a tunnel image F1 is imaged brightly, and the inside of the tunnel image F1 is imaged darkly.

Here, the photographic condition of the camera 101-1 can be set as a dark exposure condition, and the photographic condition of the camera 101-2 can be set as a bright exposure condition. In the photographic condition of the camera 101-1, a speed sign image F2 outside the tunnel image F1 can be made sharp, and good visibility can be obtained. On the other hand, blocked up shadows are generated in a speed sign image F3 inside the tunnel image F1, and the visibility of the speed sign image F3 is deteriorated. In the photographic condition of the camera 101-2, blown out highlights are generated in a speed sign image F4 outside the tunnel image F1, and the visibility of the speed sign image F4 is deteriorated. On the other hand, a speed sign image F5 inside the tunnel image F1 can be made sharp, and good visibility can be obtained.

At this time, synthesizing conditions can be set to the control unit 103A of FIG. 2 so that regions that can hold high visibility around the exit of the tunnel are synthesized. As the regions that can hold high visibility, an image imaged in a dark exposure condition can be selected outside the exit of the tunnel, and an image imaged in a bright exposure condition can be selected inside the exit of the tunnel.

The synthesizing unit 102A generates a synthetic image F603 by synthesizing the images F601 and F602 on the basis of the synthesizing conditions set by the control unit 103A. In the synthetic image F603, the speed sign image F5 is selected inside the tunnel image F1, and the speed sign image F2 is selected outside the tunnel image F1. Therefore, the sharp speed sign images F2 and F5 can be presented to the maintenance person 4 in both of the inside of the tunnel image F1 and the outside of the tunnel image F1.

As a method of switching the photographic condition of each of the cameras 101-1 and 101-2, the position of each of the cameras 101-1 and 101-2 or the position of each of the trains 1-1 and 1-2 is acquired by the positional information acquisition unit, and the photographic condition may be switched when each of the cameras 101-1 and 101-2 or each of the trains 1-1 and 1-2 comes close to the exit of the tunnel. Alternatively, the object detection unit detects the exit of the tunnel during the travel of each of the trains 1-1 and 1-2 in the tunnel, and the photographic condition may be switched when the exit of the tunnel is detected.

Alternatively, the average luminance of the entire image imaged by each of the cameras 101-1 and 101-2 is calculated during the travel of each of the trains 1-1 and 1-2, and a pattern of changes in the average luminance of the entire image may be monitored. Then, when the pattern of changes in the average luminance of the entire image obtained during the travel of each of the trains 1-1 and 1-2 matches a pattern of changes in the average luminance obtained when passing through the tunnel, each of the trains 1-1 and 1-2 is regarded as coming close to the exit of the tunnel, and the photographic condition of each of the cameras 101-1 and 101-2 may be switched.

Eighth Embodiment

Figure 12:
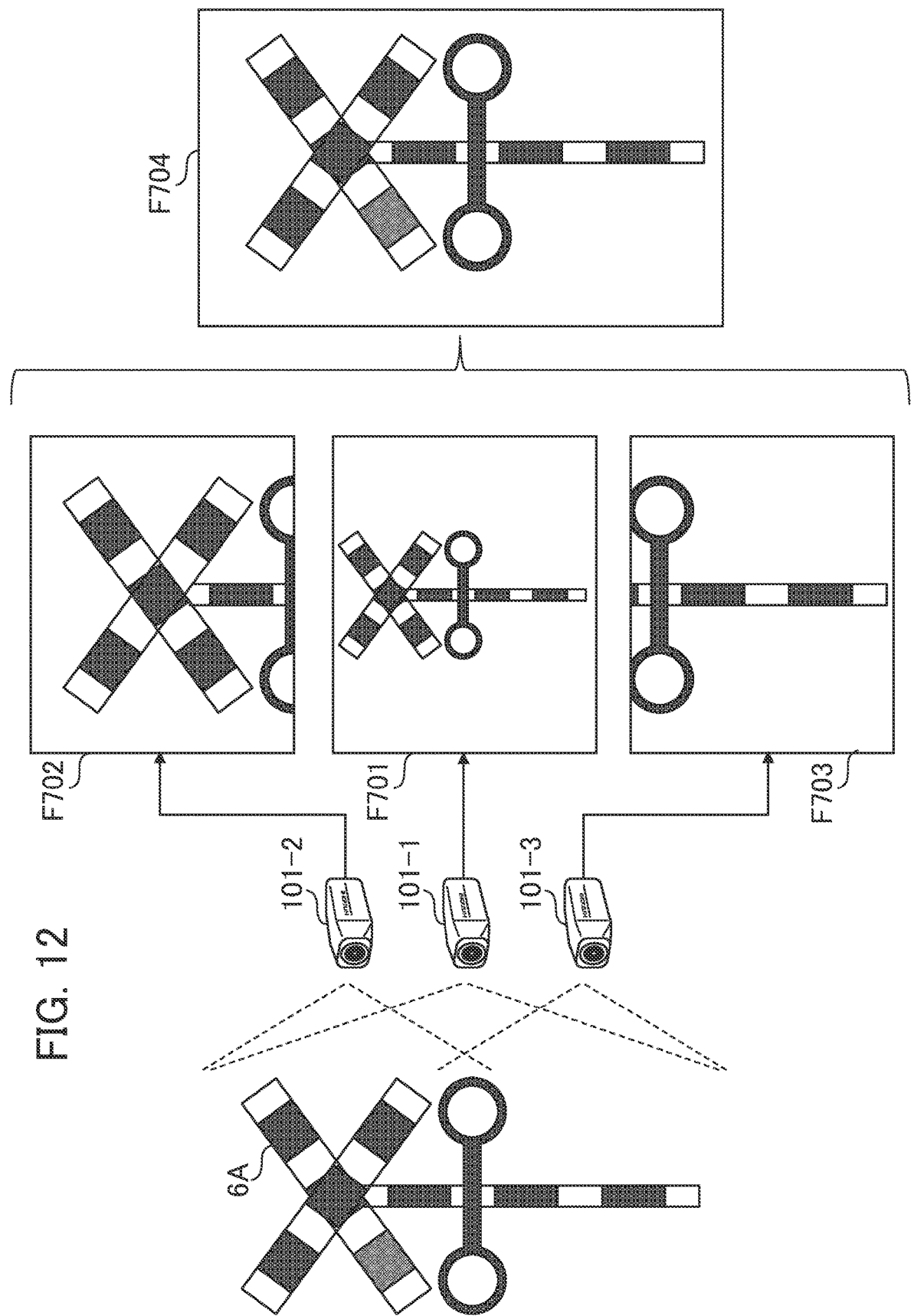
FIG. 12 is a schematic diagram for showing an image synthesizing method of an image synthesizing system according to an eighth embodiment.

FIG. 12 is a schematic diagram for showing an image synthesizing method of an image synthesizing system according to an eighth embodiment.

In FIG. 12, a state in which three cameras 101-1, 101-2, and 101-3 move on the same track is assumed. It is assumed that the viewpoint direction of the camera 101-1 is set horizontally, the viewpoint direction of the camera 101-2 is set upward, and the viewpoint direction of the camera 101-3 is set downward. Alternatively, the camera 101-1 may be installed in the middle between the cameras 101-2 and 101-3, the camera 101-2 may be installed above the camera 101-1, and the camera 101-3 may be installed under the camera 101-1.

It is assumed that a lens having the wide angle of view is attached to the camera 101-1 and a lens having the narrow angle of view is attached to each of the cameras 101-2 and 101-3. In the case where the lens having the wide angle of view is attached, a wide range can be photographed, but the resolution of a detailed part of a subject is lowered. On the other hand, in the case where the lens having the narrow angle of view is attached, a photographic range is narrow, but a predetermined range can be photographed at high resolution.

At this time, it is assumed that a wayside device 6A is imaged by the camera 101-1 to generate an image F701, the wayside device 6A is imaged by the camera 101-2 to generate an image F702, and the wayside device 6A is imaged by the camera 101-3 to generate an image F703. Since the angle of view of the camera 101-1 is wide, the entire wayside device 6A is captured in the image F701. Since the angle of view of the camera 101-2 is narrow and the viewpoint direction is set upward, an upper part of the wayside device 6A is captured in the image F702. Since the angle of view of the camera 101-3 is narrow and the viewpoint direction is set downward, a lower part of the wayside device 6A is captured in the image F703.

At this time, synthesizing conditions can be set to the control unit 103A of FIG. 2 so that, for example, regions having high similarities to the images F702 and F703 are extracted from the image F701, a positional relation between the images F702 and F703 is set on the basis of a positional relation of the regions extracted from the image F701, and the images F702 and F703 are synthesized on the basis of the positional relation between the images F702 and F703. The synthesizing unit 102A generates a synthetic image F704 by synthesizing the images F702 and F703 on the basis of the synthesizing conditions set by the control unit 103A.

Accordingly, the synthetic image F704 including the entire wayside device 6A can be generated while holding the high resolution of the images F702 and F703, and even detailed portions of the wayside device 6A can be efficiently inspected.

The photographic directions of each of the cameras 101-1, 101-2, and 101-3 can have variations such as a forward direction, a rearward direction, a side direction, and an oblique direction with respect to the moving direction. When each of the cameras 101-1, 101-2, and 101-3 turns forward or rearward with respect to the moving direction of each of the cameras 101-1, 101-2, and 101-3, the cameras 101-1, 101-2, and 101-3 can photograph the wayside device 6A from a long distance. Thus, the wayside device 6A can be included in fields of view over a long period of time. Therefore, each of the cameras 101-1, 101-2, and 101-3 can increase the amount of images related to the wayside device 6A used for synthesis, but the wayside device 6A cannot be included in a field of view when each camera comes closest to and passes just beside the wayside device 6A.

On the other hand, when each of the cameras 101-1, 101-2, and 101-3 turns to a side direction with respect to the moving direction of each of the cameras 101-1, 101-2, and 101-3, a period of time in which the cameras 101-1, 101-2, and 101-3 can include the wayside device 6A in fields of view is short, but the wayside device 6A can be largely photographed when each camera comes closest to and passes just beside the wayside device 6A.

When each of the cameras 101-1, 101-2, and 101-3 turns to an oblique direction with respect to the moving direction of each of the cameras 101-1, 101-2, and 101-3, the cameras 101-1, 101-2, and 101-3 have intermediate properties between the cameras turning forward or rearward and the cameras turning to a side direction.

There are various photographic directions suitable for an inspection according to the kinds of wayside devices. Therefore, it is desirable to set the photographic direction of each of the cameras 101-1, 101-2, and 101-3 in accordance with a wayside device to be inspected. In addition, in the case where there are many kinds of wayside devices to be inspected, a field of view for the circumference of a moving object such as a train can be evenly secured by combining the cameras 101-1, 101-2, and 101-3 having plural photographic directions with each other.

Any one of the settings of the exposure condition, the angle of view, and the photographic direction as described above may be applied, or plural settings may be combined. In addition, the number of variations of settings and the number of cameras are not limited to those shown in FIG. 11 and FIG. 12, but may be larger or smaller.

In the above-described embodiment, a configuration in which a cameras is mounted in each of different trains travelling on the same track has been explained, but plural cameras may be allowed to move on the same track by mounting a camera in each car of one train.

Ninth Embodiment

Figure 13:
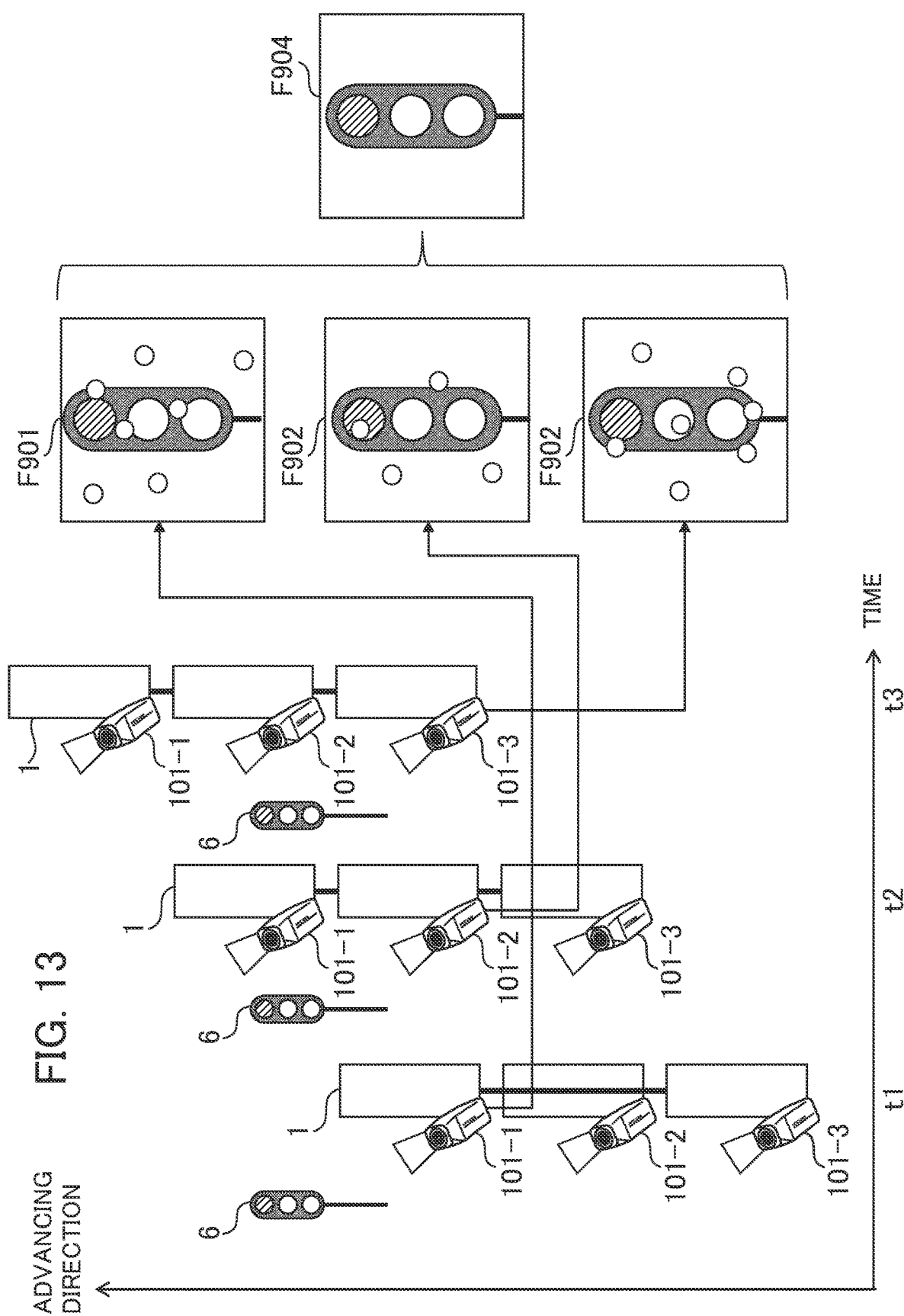
FIG. 13 is a schematic diagram for showing an image synthesizing method of an image synthesizing system according to a ninth embodiment.

FIG. 13 is a schematic diagram for showing an image synthesizing method of an image synthesizing system according to a ninth embodiment.

In FIG. 13, each of cameras 101-1, 101-2, and 101-3 is mounted in respective cars of trains 1. In addition, when the first car of the train 1 comes to the vicinity of a wayside device 6 at time t1, the camera 101-1 of the first car images the wayside device 6 to generate an image F901.

Next, when the train 1 moves forward and the subsequent second car comes to the vicinity of the wayside device 6 at time t2, the camera 101-2 of the second car images the wayside device 6 to generate an image F902. At this time, the camera 101-2 of the second car can image the wayside device 6 at the same position as the camera 101-1 of the first car, and the image F902 can have the same field of view as the image F901.

Next, when the train 1 further moves forward and the subsequent third car comes to the vicinity of the wayside device 6 at time t3, the camera 101-3 of the third car images the wayside device 6 to generate an image F903. At this time, the camera 101-3 of the third car can image the wayside device 6 at the same position as the camera 101-1 of the first car, and the image F903 can have the same field of view as the image F901.

Then, the synthesizing unit 102A applies, for example, an image process such as a median filter among the images F901 to F903 to synthesize the images F901 to F903, and can generate a synthetic image F904. Accordingly, effects of hindrance factors due to snowfalls and the like can be removed while holding image information of the wayside device 6, and the visibility of the synthetic image F904 of the wayside device 6 can be improved.

Figure 14:
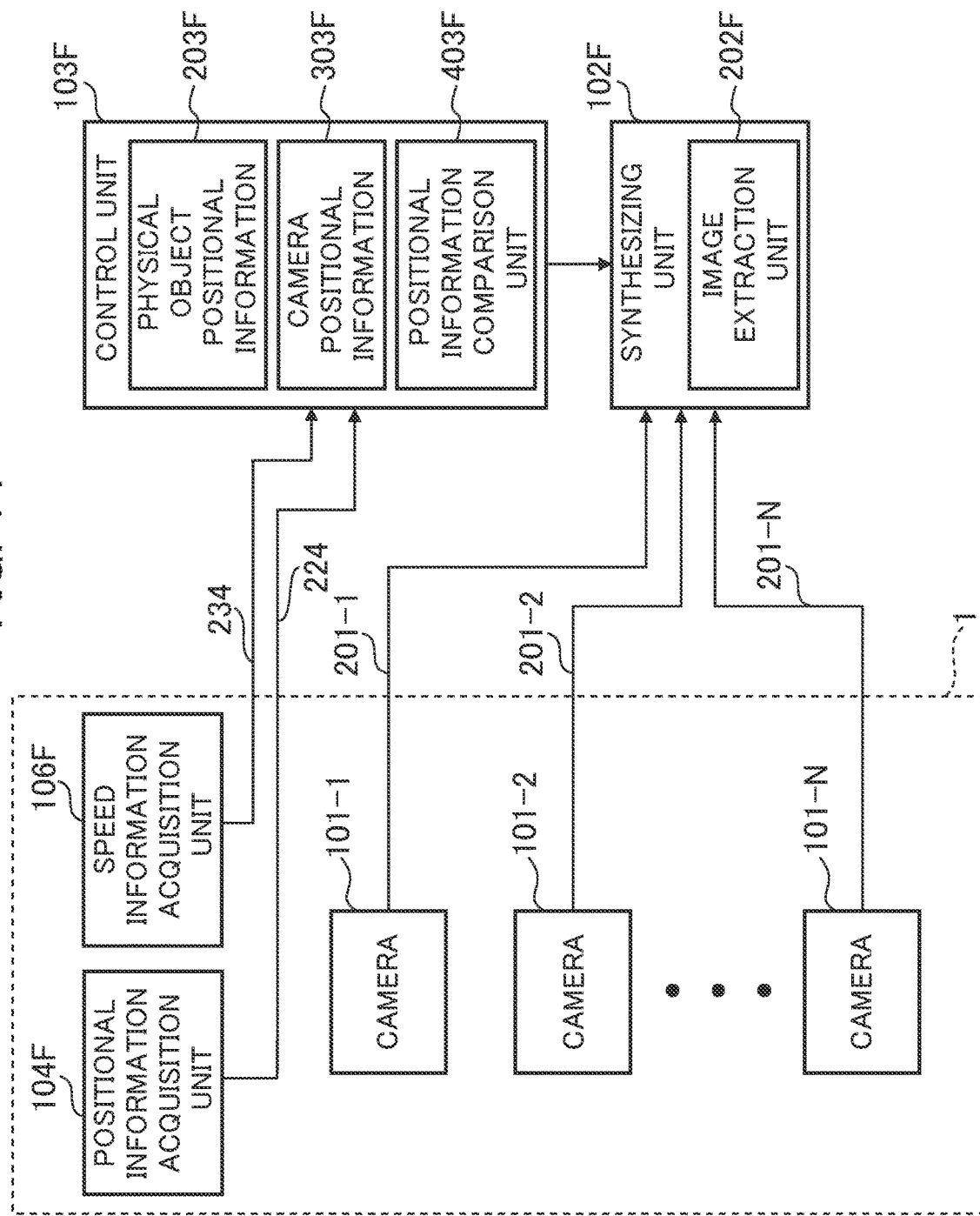
FIG. 14 is a block diagram for showing a configuration of the image synthesizing system according to the ninth embodiment.

FIG. 14 is a block diagram for showing a configuration of the image synthesizing system according to the ninth embodiment.

In FIG. 14, the image synthesizing system is provided with cameras 101-1 to 101-N, a synthesizing unit 102F, a control unit 103F, a positional information acquisition unit 104F, and a speed information acquisition unit 106F. The cameras 101-1 to 101-N can be mounted in respective cars of a train 1. The positional information acquisition unit 104F and the speed information acquisition unit 106F can be mounted in the train 1. The positional information acquisition unit 104F acquires train positional information 224 of the train 1. The speed information acquisition unit 106F acquires train speed information 234 of the train 1. The synthesizing unit 102F synthesizes images related to the same physical object imaged by each of the cameras 101-1 to 101-N. The control unit 103F sets synthesizing conditions of the images related to the same physical object imaged by each of the cameras 101-1 to 101-N.

At this time, the control unit 103F can hold physical object positional information 203F indicating the position of a wayside device 6 arranged around a track 5 and camera positional information 303F indicating the position of each of the cameras 101-1 to 101-N on the train 1. In addition, the control unit 103F can be provided with a positional information comparison unit 403F that compares the position of each of the cameras 101-1 to 101-N on the train 1 with the physical object positional information 203F. The synthesizing unit 102F can be provided with an image extraction unit 202F that extracts an image related to the same physical object from those imaged by each of the cameras 101-1 to 101-N on the basis of the comparison result by the positional information comparison unit 403F.

The train positional information 224 acquired by the positional information acquisition unit 104F and the train speed information 234 acquired by the speed information acquisition unit 106F are input to the control unit 103F. Images 201-1 to 201-N imaged by the cameras 101-1 to 101-N are input to the synthesizing unit 102F. Then, the positional information comparison unit 403F calculates the position of each of the cameras 101-1 to 101-N with respect to the ground on the basis of the train positional information 224, the train speed information 234, and the camera positional information 303F of each of the cameras 101-1 to 101-N on the train 1, and compares the position of each of the cameras 101-1 to 101-N with the physical object positional information 203F. Then, when the position of each of the cameras 101-1 to 101-N matches the physical object positional information 203F, the control unit 103F sets synthesizing conditions so as to extract and store the images imaged by each of the cameras 101-1 to 101-N the positions of which match the physical object positional information 203F. Then, the image extraction unit 202F extracts the images obtained when each of the cameras 101-1 to 101-N moves at the position of the wayside device 6 from the images 201-1 to 201-N imaged by the cameras 101-1 to 101-N. Then, the synthesizing unit 102F synthesizes the images related to the wayside device 6 collected when each of the cameras 101-1 to 101-N moves at the position of the wayside device 6.

Accordingly, plural images of the wayside device 6 used for maintenance can be extracted from an enormous amount of images obtained during long-time travel of the train 1, and these images can be synthesized without providing the positional information acquisition unit 104F for each of the cameras 101-1 to 101-N.

Figure 15:
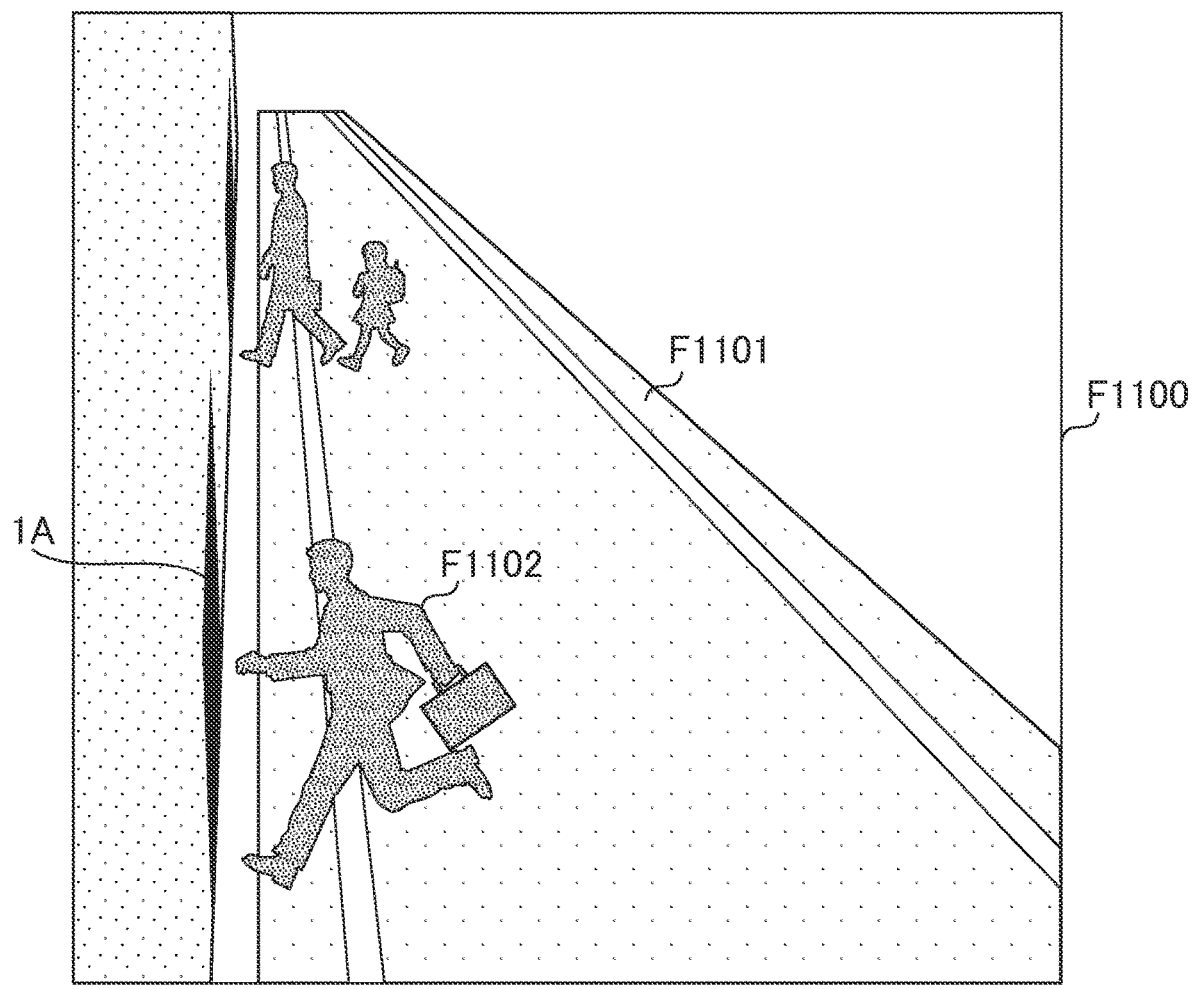
FIG. 15 is a diagram of a usage example of cameras mounted in the image synthesizing system according to the ninth embodiment.

FIG. 15 is a diagram of a usage example of the cameras mounted in the image synthesizing system according to the ninth embodiment.

In FIG. 15, each of the cameras 101-1 to 101-N can be mounted at an end portion of a side surface of each car of the train 1. At this time, each of the cameras 101-1 to 101-N can image different physical objects at the same time when the train 1 is stationary, and can image the same physical object at different times when the train 1 moves.

At this time, when the train 1 moves, the images imaged by the cameras 101-1 to 101-N are synthesized, and the synthetic image can be displayed on a display screen 2A to be presented to the maintenance person 4. When the train 1 is stationary, a state on a platform of a station is imaged by the cameras 101-1 to 101-N, and can be displayed on a monitor screen F1100 installed in the station. For example, when the train 1 is stationary, a platform image F1101, a passenger image F1102, and a door image 1A can be displayed on the monitor screen F1100. Then, a station worker recognizes a positional relation between passengers on the platform and a door of the train 1 by confirming the monitor screen F1100, and can secure the safety of the passengers on the platform at the time of opening and closing of the door when the train 1 stops.

Accordingly, the cameras 101-1 to 101-N can be used for not only a maintenance inspection of the wayside device 6 but also a use application such as security of passengers on a platform.

Tenth Embodiment

Figure 16:
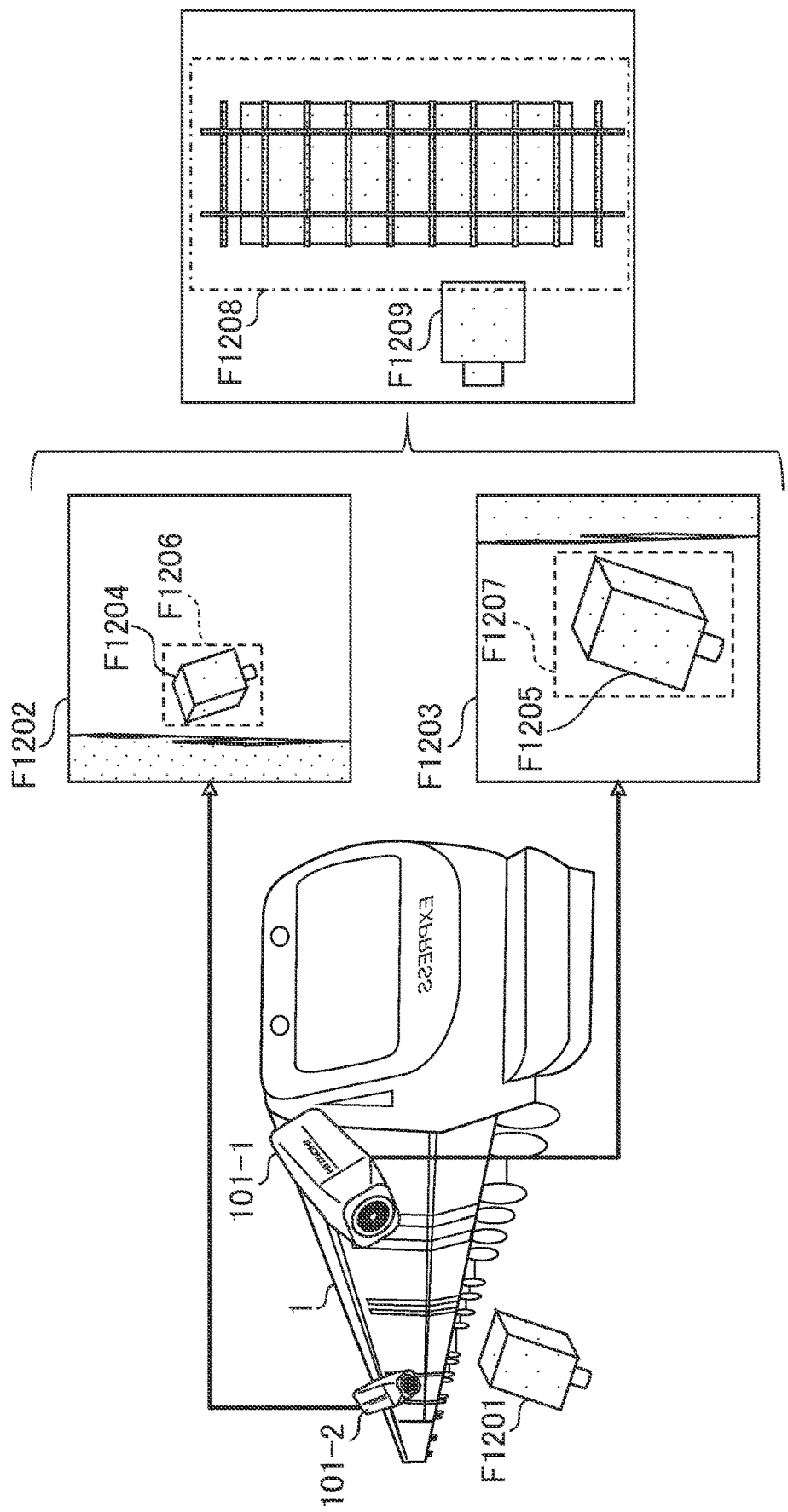
FIG. 16 is a schematic diagram for showing an image synthesizing method of an image synthesizing system according to a tenth embodiment.

FIG. 16 is a schematic diagram for showing an image synthesizing method of an image synthesizing system according to a tenth embodiment.

In FIG. 16, cameras 101-1 and 101-2 are mounted in a train 1. Here, the viewpoint directions of the cameras 101-1 and 101-2 can be made different from each other. At this time, the viewpoint directions of the cameras 101-1 and 101-2 can be set so as to come close to each other. The viewpoint directions of the cameras 101-1 and 101-2 may intersect with each other.

In addition, when the train 1 passes through the vicinity of a wayside device F1201, the cameras 101-1 and 101-2 image the wayside device F1201 from different viewpoint directions to generate images F1202 and F1203.

At this time, when it is assumed that the wayside device F1201 is inclined, the positions and sizes of wayside device images F1204 and F1205 in the images F1202 and F1203 are changed depending on a positional relation between the wayside device F1201 and each of the cameras 101-1 and 101-2.

For example, in the example of FIG. 16, the wayside device F1201 is closer to the camera 101-1 on the front side than the camera 101-2 on the rear side, and thus the wayside device image F1205 is larger than the wayside device image F1204. A dimension is reduced in only an image of one camera, and a distance to a subject is indefinite. On the contrary, a distance from each of the cameras 101-1 and 101-2 to a subject can be calculated by using the images F1202 and F1203 of the plural cameras 101-1 and 101-2 having different viewpoint directions, and three-dimensional shape measurement of the subject can be performed.

For example, an object region F1206 is extracted from the image F1202 and an object region F1207 is extracted from the image F1203 by the object detection unit 105 of FIG. 10. Then, three-dimensional measurement of the wayside device F1201 is performed on the basis of the positions and sizes of the wayside device images F1204 and F1205 in the object regions F1206 and F1207, so that a wayside device image F1209 when the wayside device F1201 is imaged from directly above can be generated. Then, an inspection such as the presence or absence of interference between the inclined wayside device F1201 and the train 1 can be conducted by confirming a positional relation between the wayside device image F1209 and a clearance limit F1208.

It should be noted that in the case where the detection by the object detection unit 105 is performed using machine learning, it is necessary, in general, to prepare an enormous amount of data for learning and to manually provide information of the position and size of an object region.

Accordingly, data for learning is collected using the plural cameras 101-1 and 101-2 with the viewpoint directions and positions already known and satisfying a three-dimensional geometrical relation among an object and the plural cameras 101-1 and 101-2 is added to conditions in learning, so that the amount of information to be manually provided can be reduced.

In addition, in the case where three-dimensional measurement is performed on the basis of detection of an object and if a part of the object region of the wayside device F1201 to be detected is hidden by another object, the position and size cannot be correctly obtained, and an error occurs in a result of the three-dimensional measurement. In such a case, a process of estimating the position and size of the original object region including the hidden region from a visible region in the acquired image is performed once and three-dimensional measurement is performed using the estimated original object region, so that an error in the result of the three-dimensional measurement can be reduced.

Accordingly, three-dimensional measurement of the wayside device F1201 can be performed using the plural cameras 101-1 and 101-2, and the railroad maintenance support system that can monitor not only a two-dimensional state of the wayside device F1201 but also a three-dimensional state of the wayside device F1201 can be realized.

Eleventh Embodiment

Figure 17:
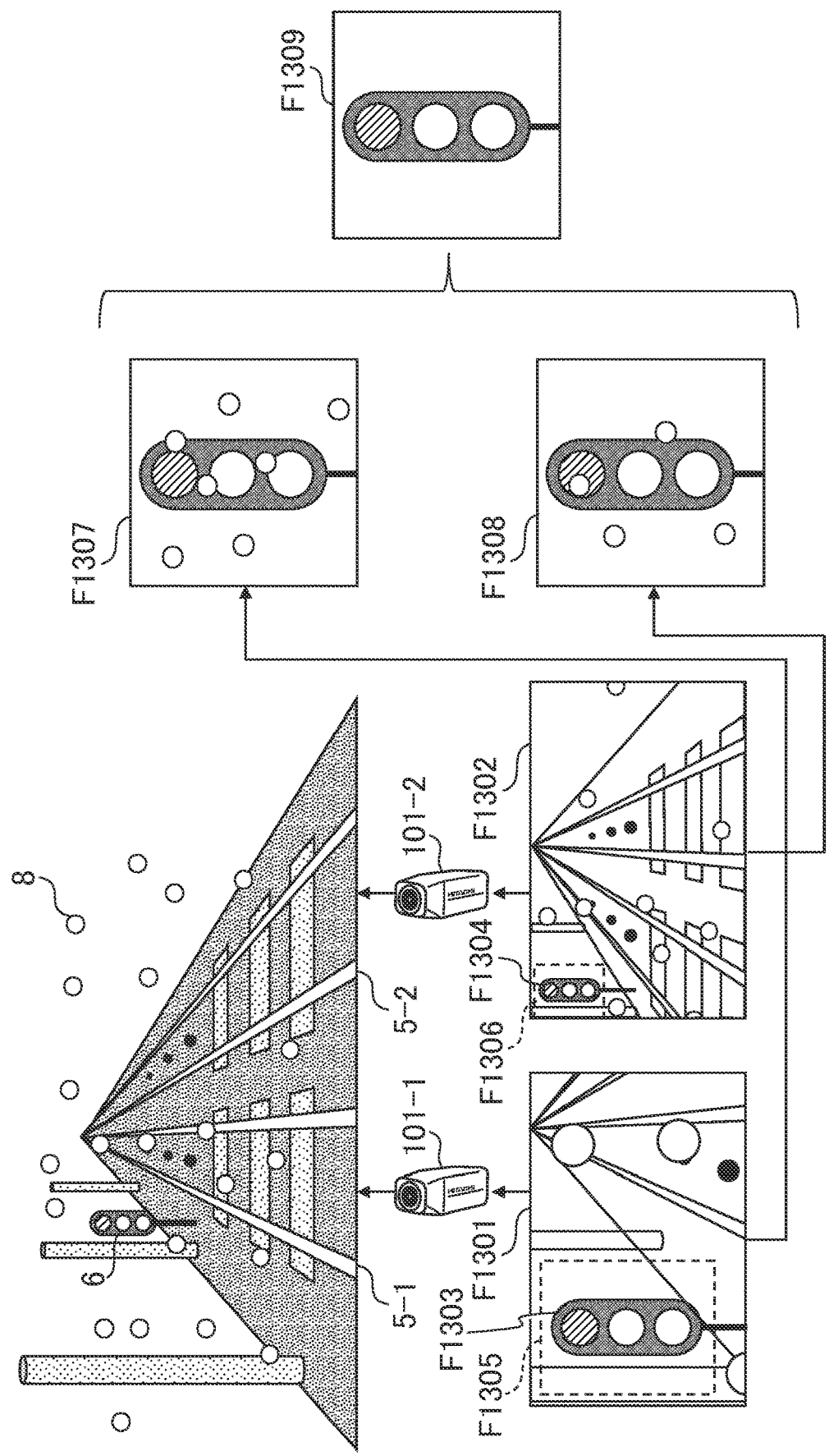
FIG. 17 is a schematic diagram for showing an image synthesizing method of an image synthesizing system according to an eleventh embodiment.

FIG. 17 is a schematic diagram for showing an image synthesizing method of an image synthesizing system according to an eleventh embodiment.

In FIG. 17, plural tracks 5-1 and 5-2 are provided as tracks on which cameras 101-1 and 101-2 move in an environment where the railroad maintenance support system is applied. These tracks 5-1 and 5-2 are arranged adjacent to and in parallel with each other. In the embodiment, the plural tracks 5-1 and 5-2 arranged adjacent to and in parallel with each other are regarded as the same tracks. As these tracks 5-1 and 5-2, a double track of a railroad can be used. The camera 101-1 can move along the track 5-1, and the camera 101-2 can move along the track 5-2.

In addition, the camera 101-1 images a wayside device 6 when passing through the vicinity of the wayside device 6, and generates an image F1301. The camera 101-2 images the wayside device 6 when passing through the vicinity of the wayside device 6, and generates an image F1302.

At this time, distances from the tracks 5-1 and 5-2 to the wayside device 6 are different from each other. Therefore, the position and size of a wayside device image F1303 in the image F1301 are different from those of a wayside device image F1304 in the image F1302.

Accordingly, for example, an object region F1305 is extracted from the image F1301 and an object region F1306 is extracted from the image F1302 by the object detection unit 105 of FIG. 10. Then, an image process is performed so that the position and size of the object region F1305 become the same as those of the object region F1306, and thus correction images F1307 and F1308 in which differences between the positions and sizes of the wayside device images F1303 and F1304 are eliminated can be generated.

Here, the images F1301 and F1302 are imaged by the cameras 101-1 and 101-2 moving on the same tracks 5-1 and 5-2, respectively. Therefore, relative relations between the positions and sizes of the wayside device images F1303 and F1304 are fixed between the images F1301 and F1302. Therefore, a fixed image process is performed for each of the object regions F1305 and F1306, and thus differences between the positions and sizes of the wayside device images F1303 and F1304 can be eliminated.

An image process such as a median filter is applied between the correction images F1307 and F1308 to synthesize the correction images F1307 and F1308, and thus a synthetic image F1309 can be generated. Accordingly, even in the case where there are the plural tracks 5-1 and 5-2 as moving routes of the cameras 101-1 and 101-2, effects of hindrance factors due to snowfalls 8 and the like can be removed while holding image information of the wayside device 6, and the visibility of the synthetic image F1309 of the wayside device 6 can be improved.

Further, when the moving direction of the camera 101-1 is opposite to that of the camera 101-2, the viewpoint direction of the camera 101-1 can be equal to that of the camera 101-2. For example, it is assumed that the camera 101-1 is mounted in a train travelling on an outgoing route and the camera 101-2 is mounted in another train travelling on a return route. At this time, the camera 101-2 is installed to face forward and the camera 101-1 is installed to face rearward, so that the viewpoint direction of the camera 101-1 can be equal to that of the camera 101-2. Alternatively, the camera 101-1 may be installed to face rearward and the camera 101-2 may be installed to face forward.

Accordingly, the robustness of the cameras 101-1 and 101-2 against inferior environmental conditions can be improved. For example, even in inferior environmental conditions where snow adheres to the lens of a camera facing forward in a heavy snowfall, it is possible to prevent snow from adhering to the lens of a camera facing rearward, and it is possible to obtain information with which a state of a physical object around the tracks 5-1 and 5-2 can be judged.

It should be noted that although an example of using a double track as the plural tracks 5-1 and 5-2 has been shown in the embodiment of FIG. 17, a quadruple track may be used as the plural tracks. At this time, the moving directions of cameras mounted in trains may alternately differ every one track, or may alternately differ every two tracks. For example, when tracks 5-1, 5-2, 5-3, and 5-4 are aligned in parallel in this order, trains may travel in the outgoing directions on the tracks 5-1 and 5-3, and the other trains may travel in the return directions on the tracks 5-2 and 5-4. Alternatively, trains may travel in the outgoing directions on the tracks 5-1 and 5-2, and the other trains may travel in the return directions on the tracks 5-3 and 5-4.

Figure 18:
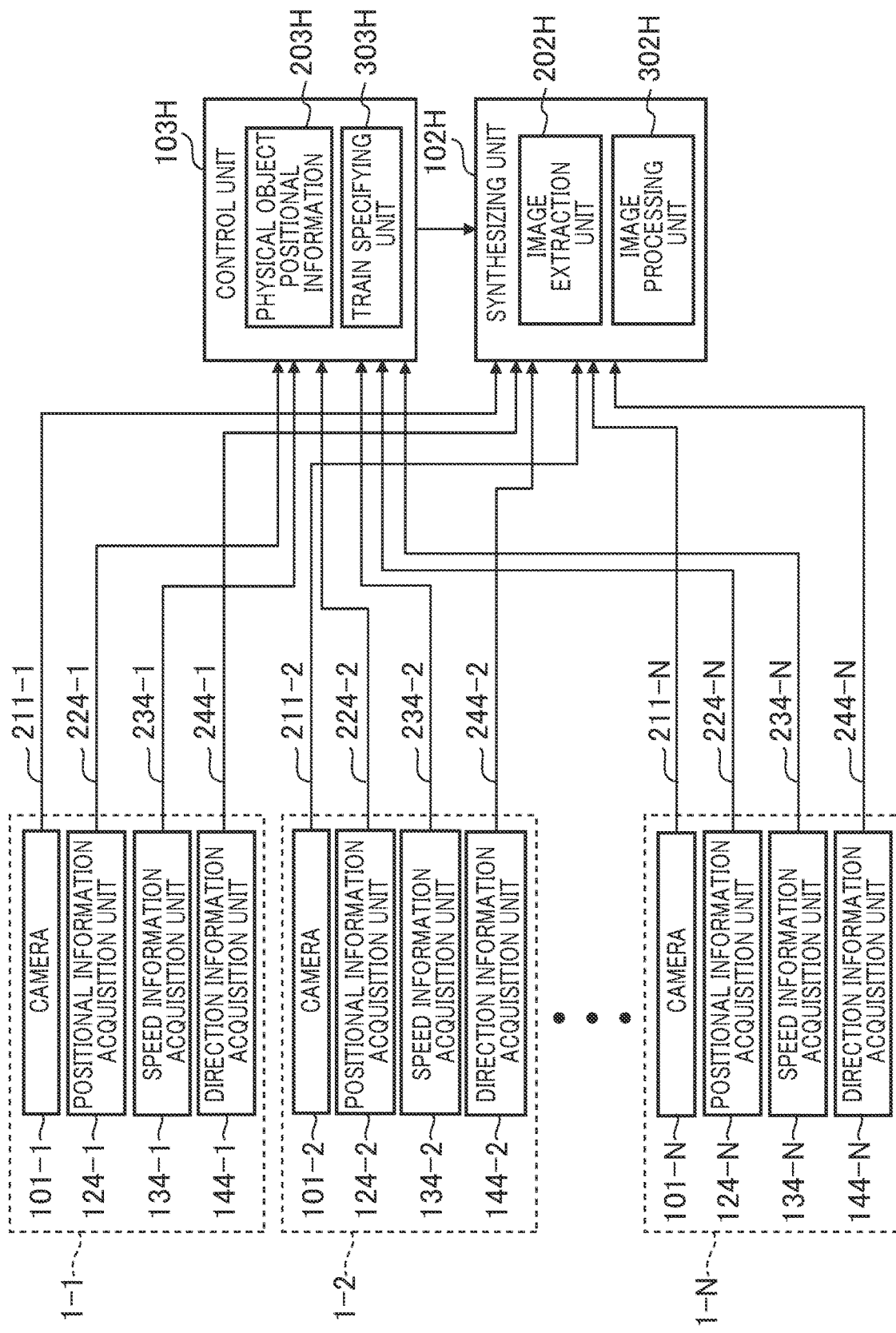
FIG. 18 is a block diagram for showing a configuration of the image synthesizing system according to the eleventh embodiment.

FIG. 18 is a block diagram for showing a configuration of the image synthesizing system according to the eleventh embodiment.

In FIG. 18, cameras 101-1 to 101-N, positional information acquisition units 124-1 to 124-N, speed information acquisition units 134-1 to 134-N, and direction information acquisition units 144-1 to 144-N are mounted in trains 1-1 to 1-N, respectively.

The positional information acquisition units 124-1 to 124-N acquire pieces of train positional information 224-1 to 224-N of the trains 1-1 to 1-N, respectively. The speed information acquisition units 134-1 to 134-N acquire pieces of train speed information 234-1 to 234-N of the trains 1-1 to 1-N, respectively. The direction information acquisition units 144-1 to 144-N acquire pieces of train direction information 244-1 to 244-N of the trains 1-1 to 1-N, respectively. The pieces of train direction information 244-1 to 244-N indicate directions of the trains 1-1 to 1-N advancing along tracks 5-1 and 5-2, respectively. The directions of the trains 1-1 to 1-N advancing along the tracks 5-1 and 5-2 can be set opposite to each other. A synthesizing unit 102H synthesizes images related to the same physical object imaged by each of the cameras 101-1 to 101-N. A control unit 103H sets synthesizing conditions of the images related to the same physical object imaged by each of the cameras 101-1 to 101-N.

At this time, the control unit 103H can hold physical object positional information 203H indicating the position of a wayside device 6 arranged around a track 5. In addition, the control unit 103H can be provided with a train specifying unit 303H specifying the trains 1-1 to 1-N that pass through the wayside device 6 within a predetermined time range. The synthesizing unit 102H can be provided with an image extraction unit 202H that extracts images related to the same physical object from those imaged by each of the cameras 101-1 to 101-N on the basis of the specification result of the trains 1-1 to 1-N by the train specifying unit 303H and the pieces of train direction information 234-1 to 234-N. In addition, the synthesizing unit 102H can be provided with an image processing unit 202H that adjusts the position and size of the image of the wayside device 6.

The pieces of train positional information 224-1 to 224-N acquired by the positional information acquisition units 124-1 to 124-N and the pieces of train speed information 234-1 to 234-N acquired by the speed information acquisition units 134-1 to 134-N are input to the control unit 103H. Images 211-1 to 211-N imaged by the cameras 101-1 to 101-N and the pieces of train direction information 234-1 to 234-N are input to the synthesizing unit 102H. Then, the train specifying unit 303H compares the pieces of train positional information 224-1 to 224-N with the physical object positional information 203H, and calculates a distance between each of the trains 1-1 to 1-N and the wayside device 6. Then, on the basis of the pieces of train speed information 234-1 to 234-N of the trains 1-1 to 1-N, time until each of the trains 1-1 to 1-N reaches the wayside device 6 is calculated, and the trains 1-1 to 1-N that pass through the wayside device 6 within the predetermined time range are specified on the basis of the car length of each of the trains 1-1 to 1-N.

Then, the control unit 103H sets synthesizing conditions so as to extract and store the images imaged by the cameras 101-1 to 101-N mounted in the trains 1-1 to 1-N when each of the trains 1-1 to 1-N passes through the wayside device 6 within the predetermined time range. Then, the image extraction unit 202H extracts the images obtained when each of the cameras 101-1 to 101-N moves at the position of the wayside device 6 from the images 211-1 to 211-N imaged by the cameras 101-1 to 101-N. Further, the image extraction unit 202H extracts the image of the wayside device 6 from those obtained when each of the cameras 101-1 to 101-N moves at the position of the wayside device 6 on the basis of the pieces of train direction information 234-1 to 234-N.

At this time, as shown in FIG. 17, the positions and sizes of the wayside device images F1303 and F1304 are different from each other between when each of the trains 1-1 to 1-N travels on the track 5-1 and when each of the trains 1-1 to 1-N travels on the track 5-2. Therefore, the image extraction unit 202H determines which of the tracks 5-1 and 5-2 each of the trains 1-1 to 1-N travels on the basis of the pieces of train direction information 234-1 to 234-N. Then, when each of the trains 1-1 to 1-N travels on the track 5-1, the wayside device image F1303 is extracted from the object region F1305 set in the image F1301. On the other hand, when each of the trains 1-1 to 1-N travels on the track 5-2, the wayside device image F1304 is extracted from the object region F1306 set in the image F1302.

Next, the image processing unit 202H generates the correction images F1307 and F1308 by performing an image process of the wayside device images F1303 and F1304 so that the positions and sizes of the wayside device images F1303 and F1304 match each other. Then, the synthesizing unit 102H applies an image process such as a median filter between the correction images F1307 and F1308 to synthesize the correction images F1307 and F1308.

Accordingly, even in the case where the plural tracks 5-1 and 5-2 are provided as travelling routes of each of the trains 1-1 to 1-N, plural images of the wayside device 6 used for maintenance can be extracted from an enormous amount of images 201-1 to 201-N obtained during long-time travel of each of the trains 1-1 to 1-N, and these images can be synthesized.

In addition, the trains 1-1 to 1-N in which the cameras 101-1 to 101-N are mounted travel on the same tracks 5-1 and 5-2. Therefore, even in the case where the cameras 101-1 to 101-N are differently mounted in the trains 1-1 to 1-N, it is possible to acquire images of the wayside device 6 having the same relative relation between the arrangement positions and sizes in the images 211-1 to 211-N imaged by the cameras 101-1 to 101-N when each of the trains 1-1 to 1-N passes through the wayside device 6. As a result, the synthesizing unit 102H can accurately specify the images of the wayside device 6 from the images 211-1 to 211-N imaged by the cameras 101-1 to 101-N, and can convert the images of the wayside device 6 so as to be suitable for synthesis by performing a fixed image process for the images of the wayside device 6 imaged by each of the cameras 101-1 to 101-N.

Twelfth Embodiment

Figure 19:
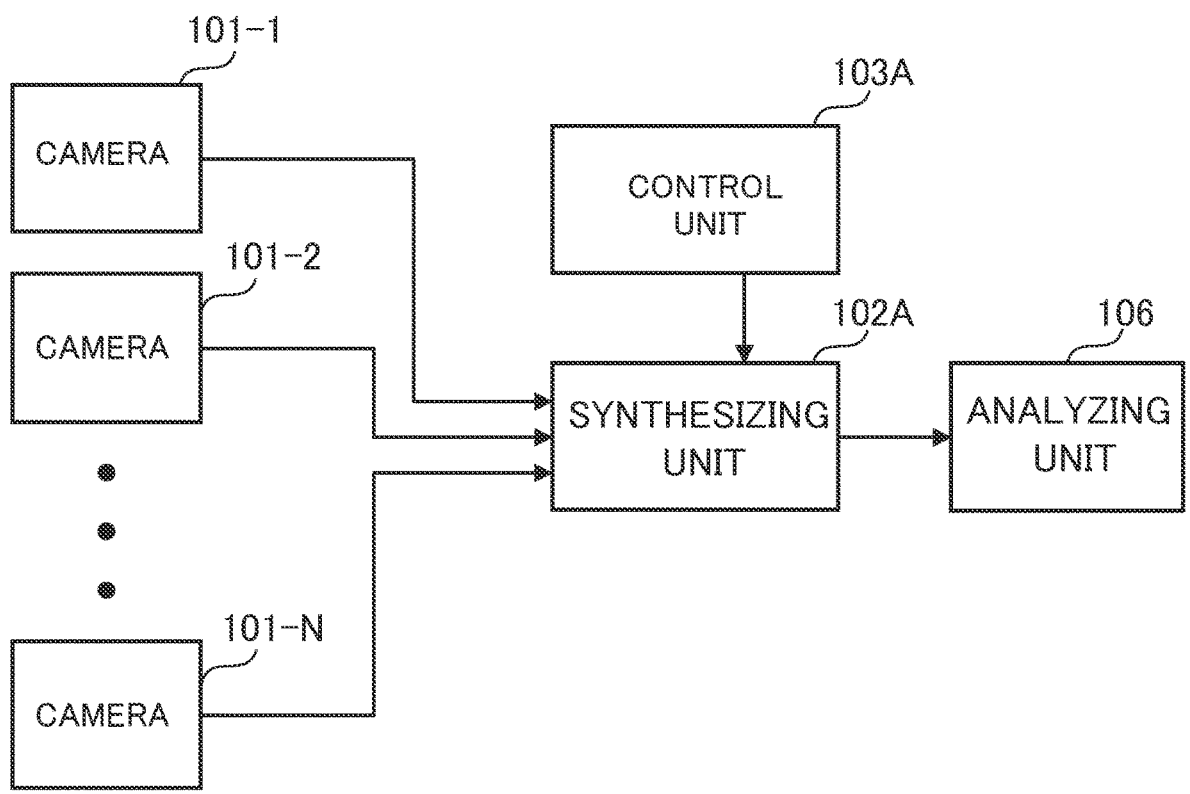
FIG. 19 is a block diagram for showing a configuration of an image synthesizing system according to a twelfth embodiment.

FIG. 19 is a block diagram for showing a configuration of an image synthesizing system according to a twelfth embodiment.

In the image synthesizing system of FIG. 19, an analyzing unit 106 is added to the configuration of FIG. 2. The analyzing unit 106 determines an abnormal state of a wayside device on the basis of a synthetic image generated by a synthesizing unit 102A, and outputs the determination result.

Accordingly, a maintenance person 4 can recognize the abnormal state of the wayside device without confirming the synthetic image. Therefore, it is not necessary for the maintenance person 4 to confirm whether or not there is deformation or damage in the wayside device while referring to the synthetic image, and the labor of the maintenance person 4 in the inspection can be reduced.

As a method of determining an abnormal state by the analyzing unit 106, for example, machine learning can be used. In this case, learning can be performed by preparing learning data of both of a normal state and an abnormal state in general. However, a case in which an abnormality occurs in a wayside device is extremely rare, and thus the amount of data sufficient for learning cannot be necessarily prepared. Accordingly, for example, an image of a wayside device in an abnormal state is created by utilizing a CG (Computer Graphics) tool or generation model technology, and may be used as learning data.

Although a case of applying the image synthesizing system to the railroad maintenance support system has been described above, the image synthesizing system can be applied to a use application other than the railroad maintenance support system.

Hereinafter, a case of applying the image synthesizing system to a road maintenance support system will be described.

Thirteenth Embodiment

FIG. 20 is a schematic diagram for showing an outline configuration of a road maintenance support system to which an image synthesizing system according to a thirteenth embodiment is applied.

In FIG. 20, a road sign F1502 is provided around a track 5A on which automobiles F1501 and F1502 travel. FIG. 20 shows a case in which the track 5A is a road. The road maintenance support system is provided with a processing apparatus 2 and cameras 101-1 and 101-2. The processing apparatus 2 and the cameras 101-1 and 101-2 are connected to each other through a network 3.

The camera 101-1 is mounted in the automobile F1501, and the camera 101-2 is mounted in the automobile F1502. At this time, each of the cameras 101-1 and 101-2 can image the same physical object at different times while moving along the same track 5A. The processing apparatus 2 generates a synthetic image F1503 by synthesizing images of the road sign F1502 imaged by the cameras 101-1 and 101-2 while moving along the same track 5A, and can display the same on a display screen 2A.

The automobiles F1501 and F1502 travel in series on the track 5A at different times. Each of the cameras 101-1 and 101-2 can image an object around the road during the travelling of the automobiles F1501 and F1502. At this time, when each of the automobiles F1501 and F1502 approaches the road sign F1502, the road sign F1502 falls within the angle of view of each of the cameras 101-1 and 101-2, and is imaged by each of the cameras 101-1 and 101-2. The images imaged by each of the cameras 101-1 and 101-2 are transmitted to the processing apparatus 2 through the network 3.

When receiving the images imaged by each of the cameras 101-1 and 101-2, the processing apparatus 2 extracts a region of the road sign F1502 from each image. Then, the processing apparatus 2 generates the synthetic image F1503 by synthesizing the region of the road sign F1502 extracted from each image, and displays the same on the display screen 2A. A maintenance person 4 conducts a visual inspection of the synthetic image F1503, so that even in the case where the maintenance person 4 is at a remote location apart from the road sign F1502, a maintenance inspection of the road sign F1502 can be conducted without a patrol on foot to the actual installation place of the road sign F1502.

Here, even in the case where the cameras 101-1 and 101-2 image the road sign F1502 while moving along the same track 5A and unclear parts are present in the image imaged by each of the cameras 101-1 and 101-2 by synthesizing the images related to the road sign F1502, the synthetic image F1503 related to the road sign F1502 can be generated so as to make the unclear parts inconspicuous. Therefore, even in the case where the cameras 101-1 and 101-2 pass through the road sign F1502 in a short time under inferior environmental conditions such as low illuminance, a drizzly rain, and snow, the synthetic image F1503 with image quality worthy of an analysis can be obtained.

It should be noted that the embodiment of FIG. 20 shows a case in which a target to be monitored by the road maintenance support system is the road sign F1502. However, the target to be monitored by the road maintenance support system is not limited to the road sign F1502. For example, the target to be monitored by the road maintenance support system may be a signal, a soundproof wall, an electric lamp, a pole, a destination guide board, a guard rail, or a lane. Depressions, cracks, or damages of a road may be the target to be monitored.

It should be noted that a road used to collect images is not limited to a one-lane road, and may have, for example, two or more lanes on each side. At this time, the automobiles F1501 and F1502 may travel on different lanes in the same advance direction, or may travel on different lanes in the opposing directions. In these cases, distances from the cameras 101-1 and 101-2 to the road sign F1502 are different from each other. At this time, for example, object detection is performed using the object detection unit 105 of FIG. 10 to generate correction images in which differences between the positions and sizes in the imaged images are eliminated, and the correction images may be used for synthesis.

In the above-described embodiments, plural cameras are mounted in trains or automobiles. However, plural cameras may be mounted in moving objects other than trains or automobiles. Plural cameras may be mounted in elevators, on production lines, or in artificial satellites. In the case where plural cameras are mounted in elevators, the image synthesizing system can be applied to an elevator maintenance support system. In the case where plural cameras are mounted on production lines, the image synthesizing system can be applied to a production line maintenance support system. In the case where plural cameras are mounted in artificial satellites, the image synthesizing system can be applied to a ground monitoring system or the like.

It should be noted that the present invention is not limited to the above-described embodiments, and includes various modified examples. For example, the embodiments have been described in detail to easily understand the present invention, and the present invention is not necessarily limited to those including all the configurations described above. In addition, some configurations of an embodiment can be replaced by a configuration of another embodiment. In addition, a configuration of an embodiment can be added to a configuration of another embodiment. In addition, some configurations of each embodiment can be added to, deleted from, and replaced by other configurations.

In addition, some or all of the above-described configurations may be configured using hardware, or may be configured so as to be realized by executing programs with a processor. In addition, the control lines and the information lines considered to be necessary in the explanation are shown, but all the control lines and the information lines in a product are not necessarily shown. In practice, almost all the configurations may be considered to be connected to each other.

LIST OF REFERENCE SIGNS 1-1, 1-2 train
2 processing apparatus
3 network
4 maintenance person
5 track
6 wayside device
7 synthetic image
101-1, 101-2, 101-N camera
102A to 102F synthesizing unit
103A to 103F control unit
104-1, 104-2, 104-N positional information acquisition unit
105-1, 105-2, 105-N object detection unit
106 analyzing unit

The invention claimed is:

1. An image synthesizing system comprising:
   N (N is an integral number equal to or larger than 2) cameras, each mounted in different vehicles of a train with a plurality of vehicles and each imaging a platform when the train stops at a station; and
   a synthesizing unit that synthesizes images related to the same physical object imaged by the N cameras while moving along the same route when the train travels; and
   a control unit that sets a synthesizing condition of an image imaged by the N cameras, wherein the control unit is configured to hold information showing a position of the object and information showing a position of each camera in the train and based on the position of the train and velocity of the train and the position of each camera in the train, calculate a position of each camera with respect to a ground and cause the synthesizing unit to synthesize an image of the object imaged by the camera when the position of each camera based on the ground and the position of the object are matched.

2. The image synthesizing system according to claim 1, further comprising a control unit that sets synthesizing conditions of the images imaged by the N cameras.

3. The image synthesizing system according to claim 1, wherein the route is a track.

4. The image synthesizing system according to claim 1, wherein the route is configured using M (M is an integral number equal to or larger than 2) routes arranged adjacent to each other in parallel.

5. The image synthesizing system according to claim 4, wherein the route includes a first route and a second route that are arranged adjacent to each other in parallel, wherein the moving direction of the camera on the first route is opposite to that of the camera on the second route, and
   wherein the viewpoint direction of the camera on the first route is the same as that of the camera on the second route.

6. The image synthesizing system according to claim 1, wherein the cameras are mounted in different moving objects moving on the route, and the moving objects move in series.

7. The image synthesizing system according to claim 1, wherein the cameras are mounted in the same moving object moving on the route.

8. The image synthesizing system according to claim 1, comprising:
   a positional information acquisition unit that acquires positional information of the N cameras,
   wherein the synthesizing unit synthesizes images related to the same physical object extracted on the basis of the positional information.

9. The image synthesizing system according to claim 1, comprising:
   an object detection unit that detects a physical object from the images imaged by the N cameras,
   wherein the synthesizing unit synthesizes images related to the same physical object detected by the object detection unit.

10. The image synthesizing system according to claim 1,
wherein only images related to the same physical object among those imaged by the N cameras are output to the synthesizing unit.

11. The image synthesizing system according to claim 1, comprising:
an analyzing unit that analyzes a state of the physical object on the basis of an image synthesized by the synthesizing unit.

12. The image synthesizing system according to claim 1,
wherein the N cameras image first physical objects that are different from each other at the same time when the cameras are stationary, and image the same second physical object at different times when the cameras move, and
wherein the synthesizing unit synthesizes images related to the second physical object.

13. The image synthesizing system according to claim 1,
wherein the cameras include a first camera and a second camera whose viewpoint directions are different from each other, and
wherein the synthesizing unit synthesizes images related to the same physical object which are imaged by the first camera and the second camera and whose viewpoint directions are different from each other.

14. The image synthesizing system according to claim 1,
wherein the cameras include a first camera and a second camera whose exposure conditions are different from each other, and
wherein the synthesizing unit synthesizes an image of a first part of the same physical object cut out from an image imaged by the first camera with an image of a second part of the same physical object cut out from an image imaged by the second camera.

15. An image synthesizing method, comprising:
imaging the same physical object with N (N is an integral number equal to or larger than 2) cameras, each mounted in different vehicles of a train with a plurality of vehicles and each imaging a platform when the train stops at a station moving along the same route; and
synthesizing images related to the same physical object imaged by the N cameras when the train travels; and
by a control unit, setting a synthesizing condition of an image imaged by the N cameras and holding information showing a position of the object and information showing a position of each camera in the train and based on the position of the train and velocity of the train and the position of each camera in the train, calculating a position of each camera with respect to a ground and causes the synthesizing unit to synthesize an image of the object imaged by the camera when the position of each camera based on the ground and the position of the object are matched.

* * * * *